(12) United States Patent
Glugla

(10) Patent No.: US 11,703,006 B2
(45) Date of Patent: Jul. 18, 2023

(54) SYSTEMS AND METHODS FOR DIAGNOSING AIR AND FUEL OFFSETS IN A PRECHAMBER

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 16/696,437

(22) Filed: Nov. 26, 2019

(65) Prior Publication Data
US 2021/0156325 A1 May 27, 2021

(51) Int. Cl.
| | | |
|---|---|---|
| *F02D 41/14* | (2006.01) | |
| *F02B 19/10* | (2006.01) | |
| *F02D 41/00* | (2006.01) | |
| *F02D 13/02* | (2006.01) | |
| *F02D 9/02* | (2006.01) | |
| *F02D 41/40* | (2006.01) | |
| *F02D 41/38* | (2006.01) | |

(52) U.S. Cl.
CPC ...... *F02D 41/1454* (2013.01); *F02B 19/1028* (2013.01); *F02D 9/02* (2013.01); *F02D 13/0226* (2013.01); *F02D 41/0002* (2013.01); *F02D 41/401* (2013.01); *F02D 2041/389* (2013.01)

(58) Field of Classification Search
CPC .. F02D 41/1454; F02D 41/0087; F02B 19/10; F02B 19/1023
USPC ........................................................ 701/104
See application file for complete search history.

(56) References Cited

U.S. PATENT DOCUMENTS

| | | | |
|---|---|---|---|
| 4,696,270 A * | 9/1987 | Pischinger | .......... F02B 19/1052 123/703 |
| 4,901,687 A | 2/1990 | Jones | |
| 5,224,450 A * | 7/1993 | Paul | ....................... F02B 19/02 123/274 |
| 6,223,846 B1 * | 5/2001 | Schechter | ................. F01L 9/10 180/165 |
| 6,293,095 B1 | 9/2001 | Yamamoto et al. | |
| 6,386,156 B1 * | 5/2002 | Stockhausen | ............. F01L 1/34 123/308 |
| 6,736,113 B1 * | 5/2004 | Ott | ......................... F02P 17/12 123/481 |

(Continued)

OTHER PUBLICATIONS

Glugla, C., "Systems and Methods for Adjusting Fueling in a Cylinder With a Pre-Chamber," U.S. Appl. No. 16/719,726, filed Dec. 18, 2019, 56 pages.

(Continued)

*Primary Examiner* — Logan M Kraft
*Assistant Examiner* — Joshua Campbell
(74) *Attorney, Agent, or Firm* — Vincent Mastrogiacomo; McCoy Russell LLP

(57) ABSTRACT

Methods and systems are provided for a vehicle engine having a pre-chamber ignition system. In one example, a method may include adjusting one or more of an air injection amount and a fuel injection amount to a pre-chamber of an engine based on an air injection offset and a fuel injection offset learned while discontinuing fueling to cylinders of the engine and reducing air flow through the engine. In this way, air and fuel may be more accurately provided to the pre-chamber, thereby decreasing an occurrence of pre-chamber misfire.

20 Claims, 7 Drawing Sheets

(56) References Cited

U.S. PATENT DOCUMENTS

| | | | |
|---|---|---|---|
| 8,146,555 B2 | 4/2012 | Solomon et al. | |
| 9,353,674 B2 | 5/2016 | Bunce et al. | |
| 10,018,104 B2 | 7/2018 | Grover, Jr. et al. | |
| 10,400,696 B2 | 9/2019 | Blaxill et al. | |
| 2005/0241376 A1* | 11/2005 | Miyata | G01M 15/11 73/114.04 |
| 2006/0212212 A1* | 9/2006 | Akasaka | B60W 20/15 701/112 |
| 2017/0198671 A1* | 7/2017 | Dudar | F02M 35/104 |
| 2017/0350332 A1* | 12/2017 | Martin | F02D 41/0087 |

OTHER PUBLICATIONS

Glugla, C., "Systems and Methods for Fouling Reduction in a Pre-Chamber," U.S. Appl. No. 16/788,485, filed Feb. 12, 2020, 57 pages.

* cited by examiner

SYSTEMS AND METHODS FOR DIAGNOSING AIR AND FUEL OFFSETS IN A PRECHAMBER

FIELD

The present description relates generally to methods and systems for controlling a vehicle engine to diagnose air and/or fuel offsets in an active pre-chamber of a cylinder.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a "pre-chamber." The pre-chamber may be walled chamber located in the clearance volume of the cylinder and may include a spark plug, an $O_2$ or air injector, and a fuel injector. During engine operation, a first air-fuel mixture is introduced into the pre-chamber, and a second air-fuel mixture is introduced into the cylinder. When ignition is indicated, the spark plug in the pre-chamber actuates, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder to produce torque.

Pre-chamber ignition may offer performance and efficiency increases over a spark-ignition engine during some operating conditions. For example, a cylinder with pre-chamber ignition may operate with a higher (e.g., leaner) air-fuel ratio (AFR) than a similar cylinder of a traditional spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, pre-chamber ignition may be affected by inaccurate air and/or fuel injection. For example, an air injector may inject more air into the pre-chamber than commanded, producing a leaner AFR within the pre-chamber than desired. In another example, a fuel injector may inject more fuel into the pre-chamber than commanded, producing a richer AFR within the pre-chamber than desired. In some examples, both the air injector and the fuel injector may have injection offsets that cause them to inaccurately deliver air and fuel, respectively. When a pre-chamber operates with one or both of an air injection offset and a fuel injection offset, pre-chamber misfire may occur more frequently relative to when a pre-chamber operates with no injection offsets. Pre-chamber misfire may include the air-fuel mixture in the pre-chamber not igniting due to an overly lean AFR, for example, and may negatively affect engine performance. As an example, when a pre-chamber misfires, no ignition source is provided to the air-fuel mixture in the cylinder. As a result, the cylinder also misfires (e.g., no combustion occurs in the cylinder), which may decrease engine power output. However, current misfire detection methods do not distinguish between misfires caused by the pre-chamber misfiring and misfires caused by the cylinder misfiring even when the pre-chamber fires. As a result, it may be difficult to identify a source of the misfire, which may increase repair times and associated costs.

The inventors herein have recognized the above issues and have developed a method to at least partially address them. In one example, the issues described above may be addressed by a method, comprising: adjusting at least one of an air injection amount and a fuel injection amount to a pre-chamber of an engine based on offsets learned while discontinuing fueling to cylinders of the engine and reducing air flow through the engine. In this way, air injection and/or fuel injection errors in the pre-chamber may be identified and corrected, thereby reducing an occurrence of pre-chamber misfire.

As one example, the offsets may include an air injection offset of an air injector of the pre-chamber and a fuel injection offset of a fuel injector of the pre-chamber. The air injection offset and the fuel injection offset may be learned based on exhaust gas measurements obtained while operating the pre-chamber with a series of air-fuel ratio perturbations. For example, the exhaust gas measurements may include oxygen measurements from an exhaust gas oxygen sensor of combustion gases from the pre-chamber at each air-fuel ratio in the series of air-fuel ratio perturbations. By obtaining the exhaust gas measurements while discontinuing fueling to cylinders of the engine and reducing air flow through the engine, the combustion gases from the pre-chamber may be measured with at least reduced interference from intake air and without interference from cylinder combustion gases, increasing an accuracy of the measurement and increasing a signal-to-noise ratio.

As another example, a controller may determine an expected air-fuel ratio for each air-fuel ratio in the series of air-fuel ratio perturbations to an actual air-fuel ratio in the series of air-fuel ratio perturbations. The expected air-fuel ratio may be determined from a commanded air injection and a commanded fuel injection amount during each air-fuel ratio in the series of air-fuel ratio perturbations, while the actual air-fuel ratio may be determined from the exhaust gas measurements during each air-fuel ratio in the series of air-fuel ratio perturbations. The controller may determine the air injection offset and the fuel injection offset by comparing the actual air-fuel ratio of the pre-chamber combustion gases during each air-fuel ratio in the series of air-fuel ratio perturbations to the expected air-fuel ratio for each air-fuel ratio in the series of air-fuel ratio perturbations. In some examples, at least one of the air injection offset and the fuel injection offset may be equal to zero, indicating that the corresponding injector is accurately delivering the commanded amount. The air injection amount and the fuel injection amount may then be adjusted based on the determined air injection offset and the determined fuel injection offset, respectively, in order to bring the air injection amount to the commanded air injection amount and the fuel injection amount to the commanded fuel injection amount.

In this way, an accuracy of the pre-chamber air injection amount and fuel injection amount may be increased. By increasing the accuracy of the pre-chamber air injection amount and the pre-chamber fuel injection amount, an occurrence of pre-chamber misfire may be decreased, thereby also decreasing an occurrence of cylinder misfire. Additionally, variability in the pre-chamber ignition event may be decreased, which may increase engine performance and increase fuel economy. For example, the higher accuracy of the pre-chamber injection amounts may reduce or prevent fueling errors in the cylinder due to non-stoichiometric pre-chamber exhaust gases. By reducing cylinder fueling errors via accurate pre-chamber injections, vehicle emissions may be reduced. By preempting pre-chamber misfire due to inaccurate air and/or fuel injection, when misfire is detected in an engine, pre-chamber injector-based errors may be ruled out, which may streamline repair procedures. As a result, repair costs and repair times may be reduced. Overall, customer satisfaction may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
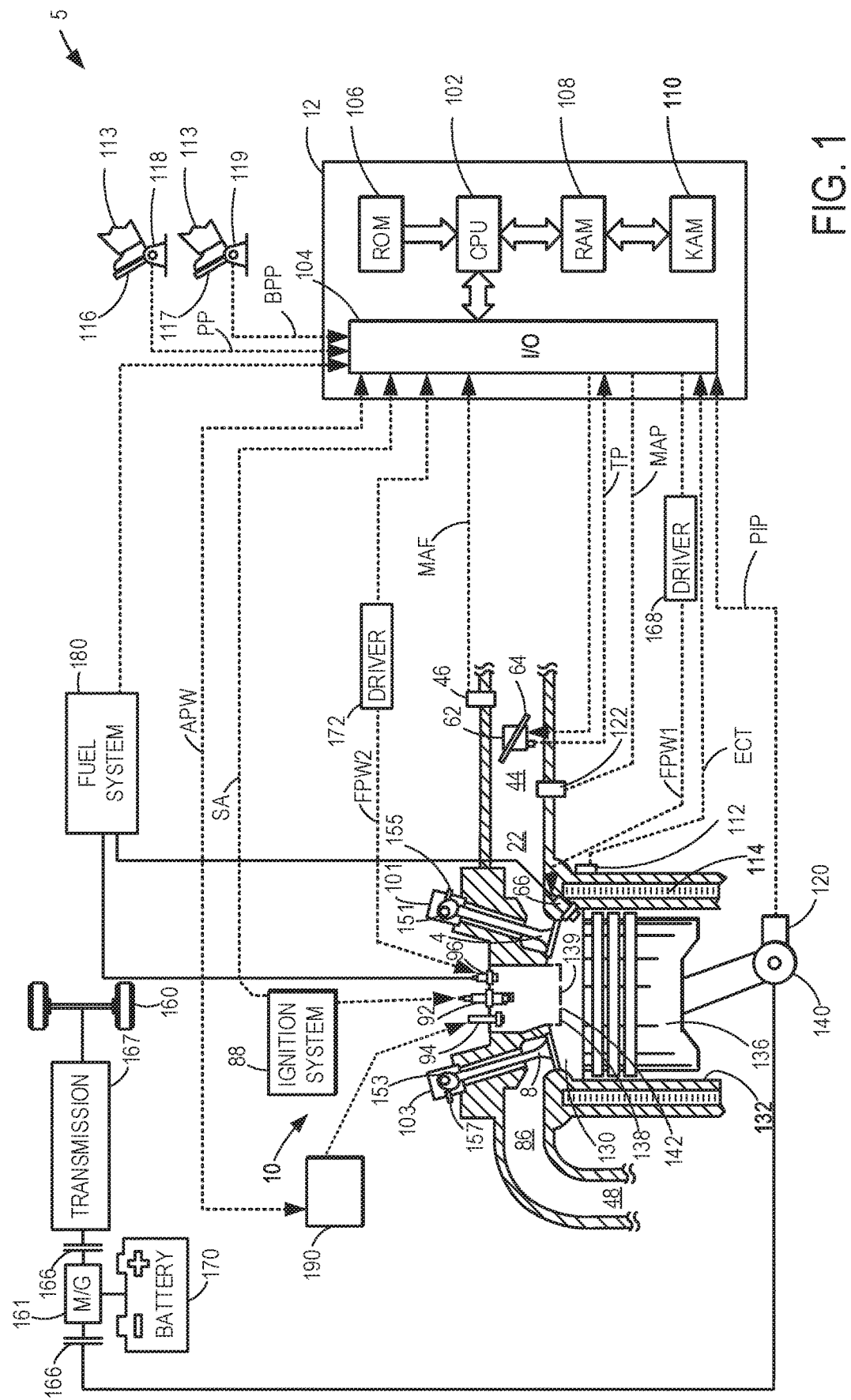
FIG. 1 shows a schematic depiction of a cylinder configuration in an engine system of a vehicle.

The following description relates to systems and methods for diagnosing offsets of one or more injectors (e.g., an air injector and/or a fuel injector) of a pre-chamber of an engine cylinder, such as the engine cylinder shown in FIG. 1. The engine cylinder may be included in various multi-cylinder configurations, such as the example engine system configuration shown in FIG. 2. The pre-chamber may be operated according to the method of FIG. 3 to combust an air-fuel mixture within the pre-chamber. Further, a controller of the engine may adjust cylinder fueling and air flow to perform a pre-chamber diagnostic, including determining and correcting pre-chamber air injector and/or pre-chamber fuel injection offsets, according to the example method of FIG. 4. A prophetic example timeline, shown in FIG. 5, demonstrates adjustments to engine operation during the pre-chamber diagnostic. FIGS. 6-9 show example adjustments to pre-chamber operation during the pre-chamber diagnostic to determine air and fuel injection offsets. FIGS. 6-9 also show how fuel and air injection may be adjusted to compensate for non-zero injection offsets determined during the pre-chamber diagnostic.

As used herein, an injection (or injector) offset refers to a deviation from a commanded injection amount (e.g., an error in an injection amount supplied by an injector). As an example, the offset may be caused by a small deviation or bias in a voltage or current supplied to the injector that causes the injector to be open for a longer duration than expected from a command (e.g., actuation) signal, resulting in more than the commanded injection amount being delivered (e.g., a positive injection offset), or open for a shorter duration than expected from the command signal, resulting in less than the commanded injection amount being delivered (e.g., a negative injection offset). Zero injection offset for an injector refers to the injector accurately injecting the commanded injection amount.

Turning now to the figures, FIG. 1 shows a partial view of a single cylinder 130 of an internal combustion engine 10 that may be included in a vehicle 5. Internal combustion engine 10 may be a multi-cylinder engine, as will be described below with respect to FIG. 2. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders, at least in some examples.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate exhaust valve 8 such that it remains closed and does not open at its set timing. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8. As one example, CPS may be used to switch from a cam lobe having higher lift to a cam lobe having lower lift for one or more or each of cams 151 and 153 to decrease air flow through cylinder 130. As another example, a continuously variable valve lift (CVVL) system may be used to control an amount of air charge provided to cylinder 130 by adjusting a lift of intake valve 4. Although engine 10 is shown having a throttle 62, in some such examples of the CVVL system, throttle 62 may be omitted. Instead, intake air flow may be entirely controlled by adjusting the opening timing and amount of intake valve 4.

Further, in some examples, engine 10 may be a variable displacement engine (VDE) configured to selectively deactivate one or more cylinders during selected conditions, such as when a full torque capability of the engine is not needed. As used herein, cylinder valve deactivation (e.g., of intake valve 4 and/or exhaust valve 8) refers to the deactivated valve(s) remaining fully closed throughout an engine cycle. As used herein, "engine cycle" refers to a period during which each engine cylinder fires once in a designated cylinder firing order. In one example, intake valve 4 and exhaust valve 8 may be deactivated during operation in a VDE mode via hydraulically actuated lifters coupled to valve pushrods or via a cam profile switching mechanism in which a cam lobe with no lift is used for the deactivated valve(s). Still other valve deactivation mechanisms may also be used, such as for electrically actuated valves. In one example, deactivation of intake valve 4 may be controlled by a first VDE actuator, while deactivation of exhaust valve 8 may be controlled by a second VDE actuator. In an alternative example, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders on a bank. It may be appreciated that if the cylinder is a non-deactivatable cylinder of the VDE engine, then the cylinder may not have any valve deactivating actuators.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

As a non-limiting example, cylinder 130 is shown including one cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions, such as air charge temperature. Furthermore, for a single combustion event, multiple injections of the delivered fuel may be performed per cycle. The multiple injections may be performed during the compression stroke, intake stroke, or any appropriate combination thereof. Further still, during some conditions, fuel delivery by fuel injector 66 may be disabled, such as when cylinder 130 is selected for deactivation during operation in VDE mode or during other fuel-cut operations, as will be further described below with respect to FIG. 4.

In the example shown in FIG. 1, each cylinder 130 of engine 10 includes a pre-chamber 138 for initiating combustion. Pre-chamber 138 is defined by pre-chamber walls 139 and includes a spark plug 92, an air injector 94, and a pre-chamber fuel injector 96. Air injector 94 is shown directly coupled to pre-chamber 138 for injecting air and/or oxygen into the pre-chamber. One or more of ambient air, oxygen, and another combustible gas may be delivered to air injector 94 from a pre-chamber air source 190. In some examples, air injector 94 is an electromagnetic (e.g., solenoid) injector, and may inject air and/or $O_2$ in proportion to a pulse-width of a signal APW received from controller 12 via pre-chamber air source 190. Note that in relation to pre-chamber air source 190, the term "air" may refer herein to ambient air, oxygen (e.g., $O_2$), hydrogen (e.g., $H_2$), or a mixture of such gases. In some examples, the pre-chamber air source 190 supplies air injector 94 with ambient air from an air intake passage of the engine, which may be stored in a pressurized tank before injection. In other examples, pre-chamber air source 190 supplies air injector 94 with onboard-generated $O_2$, which may be stored in a pressurized tank before injection. For example, the pressurized tank of pre-chamber air source 190 may be maintained at a desired pressure by an associated pump. A pressure differential between the pressurized tank and the pre-chamber and an open time of air injector 94 (e.g., as determined by the pulse-width of the signal APW) may determine the mass of air or $O_2$ delivered to pre-chamber 138, for example.

Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air fuel ratio (AFR) that may differ from an AFR in cylinder 130. In one example, the AFR in pre-chamber 138 may be richer (e.g., have a higher proportion of fuel) than the AFR in cylinder 130. In another example, the AFR in the pre-chamber may be the same as the AFR in the cylinder. In yet another example, the AFR in pre-chamber 138 may be leaner (e.g., have a higher proportion of air) than the AFR in cylinder 130.

Further, the pre-chamber walls 139 may include a plurality of openings, such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas air-fuel ratio, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings 142 in the pre-chamber walls 139, including opening 142. The plurality of openings may be arranged such that jets of flame are evenly distributed in cylinder 130. The jets of flame may ignite the air-fuel mixture in cylinder 130, causing combustion. After combustion, a mixture of exhaust gases from both pre-chamber 138 and cylinder 130 may be expelled from the cylinder via exhaust valve 8.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed. Controller 12 may receive various signals from sensors coupled to engine 10, in addition to those signals previously discussed, including a measurement of inducted mass air flow (MAF) from a mass air flow sensor 46, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) of throttle 62 from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, examples of which are described with respect to FIGS. 3 and 4. For example, the controller may disable cylinder fuel injection via fuel injector 66 and adjust intake valve 4 and exhaust valve 8 timing in order to diagnose air injection and/or fuel injection offsets in pre-chamber 138.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Figure 2:
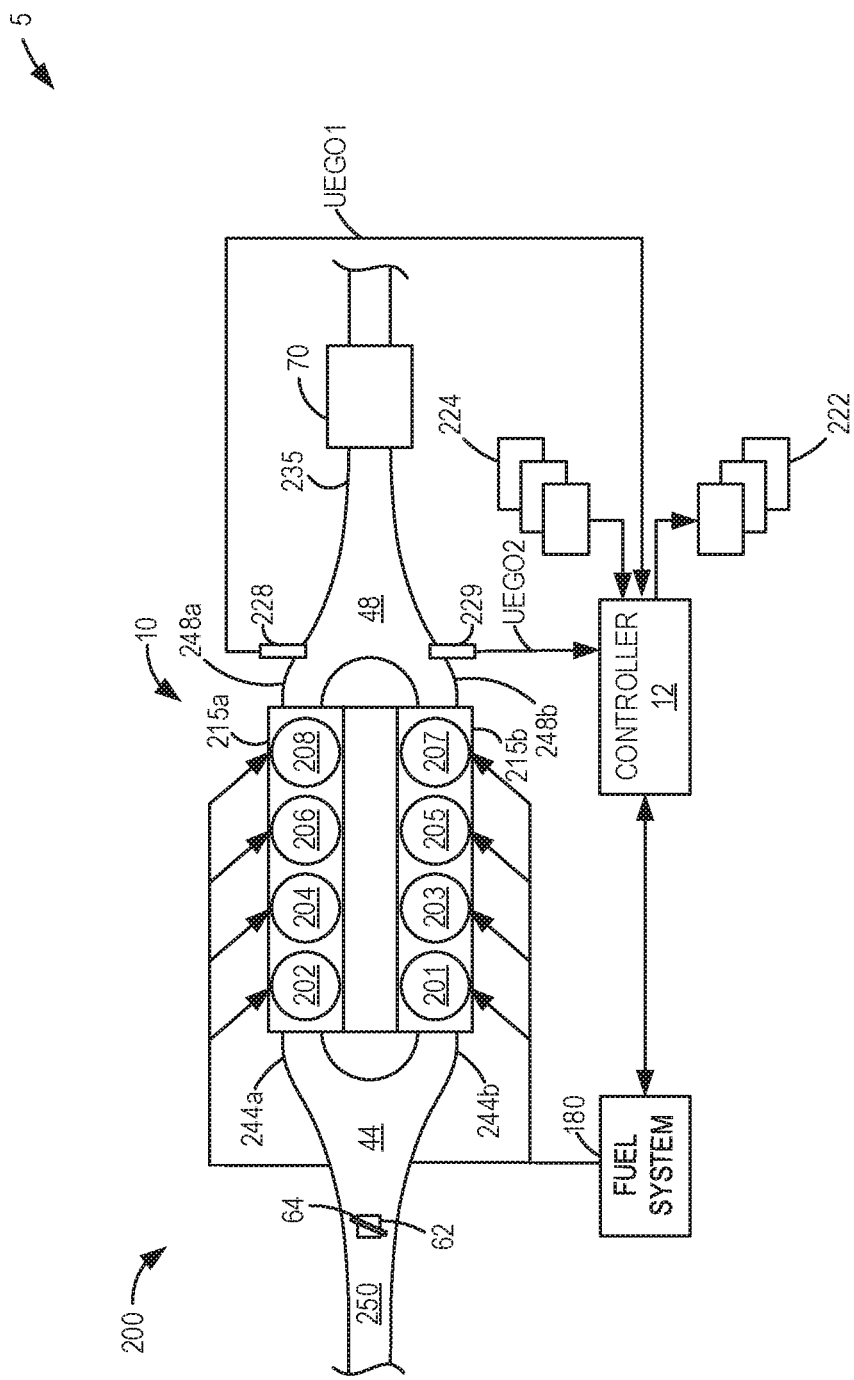
FIG. 2 shows a schematic depiction of an example engine system.

As mentioned above, FIG. 1 shows only one cylinder of multi-cylinder engine 10. Referring now to FIG. 2, a schematic diagram of an example engine system 200 is shown, which may be included in the propulsion system of vehicle 5 of FIG. 1. As such, components previously introduced in FIG. 1 are represented with the same reference numbers and are not re-introduced. FIG. 2 shows engine 10 having a first bank 215a and a second bank 215b of cylinders. In the depicted example, engine 10 is a V-8 engine with the first and second banks each having four cylinders. As shown, cylinders 202, 204, 206, and 208 comprise first bank 215a, and cylinders 201, 203, 205, and 207 comprise second bank 215b. However, other numbers of cylinders and engine configurations are also possible (e.g., I-3, V-4, I-4, I-6, V-12, opposed 4, and other engine types). Thus, the number of cylinders and the arrangement of the cylinders may be changed without parting from the scope of this disclosure.

The cylinders shown in FIG. 2 may each have a cylinder configuration, such as the cylinder configuration described above with respect to FIG. 1. Thus, each cylinder shown in FIG. 2 may include some or all of the components shown in FIG. 1. For example, each of cylinders 201, 202, 203, 204, 205, 206, 207, and 208 includes at least one intake valve 4 and at least one exhaust valve 8 (referred to herein as cylinder intake valves and cylinder exhaust valves, respectively), its own pre-chamber 138, and its own cylinder fuel injector 66. The engine cylinders may be capped on the top by a cylinder head.

In the example shown in FIG. 2, first engine bank 215a receives intake air from intake manifold 44 via a first intake manifold passage 244a, and second engine bank 215b receives intake air from intake manifold 44 via a second intake manifold passage 244b. For example, intake manifold 44 may split into first intake manifold passage 244a and second intake manifold passage 244b downstream of throttle 62 such that throttle 62 controls air flow to both first engine bank 215a and second engine bank 215b via (common) intake manifold 44.

Combustion gases may flow from exhaust manifold 48 to an exhaust passage 235. Exhaust passage 235 includes an emission control device 70 coupled therein, downstream of exhaust manifold 48. Emission control device 70 may be a three-way catalyst, a NOx trap, various other emission control devices, or combinations thereof. First engine bank 215a exhausts combustion gases to exhaust manifold 48 via a first exhaust manifold passage 248a, and second engine bank 215b exhausts combustion gases to exhaust manifold 48 via a second exhaust manifold passage 248b. Thus, combustion gases within first exhaust manifold passage 248a exhausted by first engine bank 215a are separate from combustion gases within second exhaust manifold passage 248b exhausted by second engine bank 215b upstream of (common) exhaust manifold 48.

Two symmetrically opposed exhaust gas oxygen sensors, a first exhaust gas oxygen sensor 228 and a second exhaust gas oxygen sensor 229, are shown coupled to first exhaust manifold passage 248a and second exhaust manifold passage 248b, respectively. The first and second exhaust gas oxygen sensors 228 and 229 may be any suitable sensors for providing an indication of exhaust gas air-fuel ratio (AFR), such as a linear oxygen sensor or UEGO (universal or wide-range exhaust gas oxygen), a two-state oxygen sensor or EGO, a HEGO (heated EGO), etc. In the depicted example, the first exhaust gas oxygen sensor 228 and second exhaust gas oxygen sensor 229 are UEGO sensors configured to indicate relative enrichment or enleanment (e.g., with respect to stoichiometry) of the exhaust gas in each passage prior to passing through emission control device 70. For example, the output voltage of the UEGO sensors may be a linear function of the amount of oxygen present in the exhaust. As shown, first UEGO sensor 228 is positioned to measure zoned exhaust flow from first bank 215a, providing controller 12 with an output signal UEGO1, and second UEGO sensor 229 is positioned to measure zoned exhaust flow from second bank 215b, providing controller 12 with an output signal UEGO2.

In addition to UEGO1 from first UEGO sensor 228 and UEGO2 from second UEGO sensor 229, controller 12 may receive various signals from sensors 224 coupled to engine 10 (e.g., MAF sensor 46 of FIG. 1, MAP sensor 122 of FIG. 1, Hall effect sensor 120 of FIG. 1, etc.) and send control signals to various actuators 222 coupled to the engine and/or vehicle (e.g., throttle 62, fuel injector 66 of FIG. 1, etc.).

Figure 3:
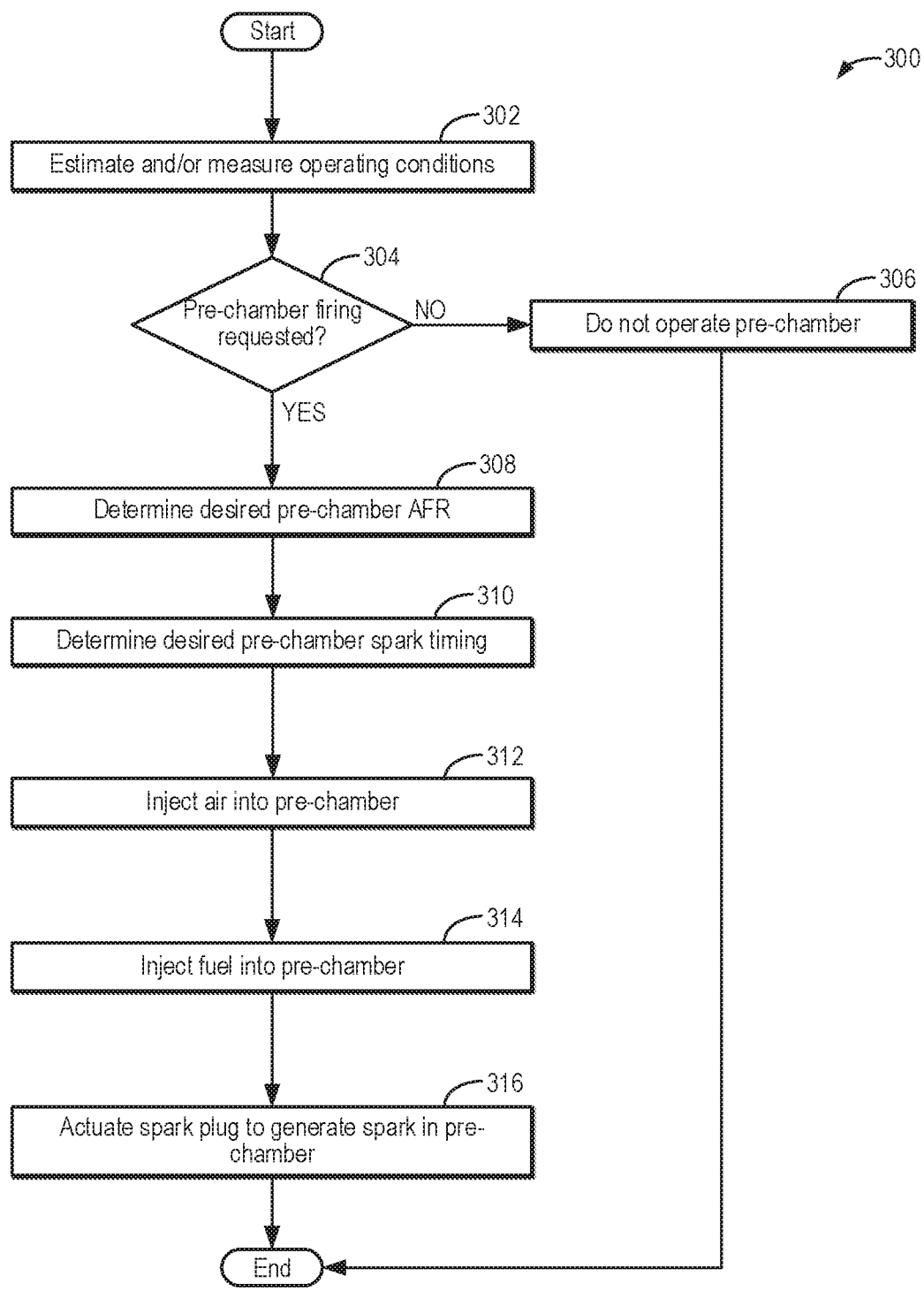
FIG. 3 shows an example method for operating a pre-chamber of a pre-chamber ignition system.

Next, FIG. 3 shows an example method for operating a pre-chamber of an engine to combust an air-fuel mixture within the pre-chamber. As one example, operating the pre-chamber provides an ignition source for a cylinder of the engine. Method 300 will be described with respect to engine system 200 shown in FIG. 2 and the cylinder configuration shown in FIG. 1, although method 300 may be applied in other systems that include a pre-chamber with a spark plug, a fuel injector, and an air/$O_2$ injector. Further, method 300 will be described for one pre-chamber and cylinder pair, although it may be understood that method 300 may be simultaneously executed for every cylinder of the engine. Instructions for carrying out method 300 and the rest of the methods included herein may be executed by a controller, such as controller 12 of FIGS. 1-2, based on instructions stored on a memory of the controller and in conjunction with signals received from sensors of the engine system, such as the sensors described above with reference to FIGS. 1-2. The controller may employ actuators of the pre-chamber ignition system, including a pre-chamber fuel injector (e.g., pre-chamber fuel injector 96 of FIG. 1), a pre-chamber spark plug (e.g., pre-chamber spark plug 92 of FIG. 1), and a pre-chamber air injector (e.g., pre-chamber air injector 94 shown in FIG. 1) to adjust engine operation according to the methods described below.

At 302, method 300 includes estimating and/or measuring operating conditions. The operating conditions may include, for example, vehicle speed, engine speed, engine load, an engine temperature, an exhaust gas AFR, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an acceleration position sensor, such as acceleration pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the AFR may be determined based on an oxygen level detected by an exhaust gas oxygen sensor, such as first UEGO sensor 228 or second UEGO sensor 229 of FIG. 2. Similarly, the throttle position may be measured using a throttle position sensor coupled to the throttle.

At 304, method 300 includes determining whether a firing event is requested in the pre-chamber. In some examples, the pre-chamber firing event may be requested during nominal engine operation to provide an ignition source for the cylinder during each cylinder cycle (e.g., a four stroke cycle including an intake stroke, a compression stroke, a power stroke, and an exhaust stroke). In another example, the pre-chamber firing event may be requested during an engine diagnostic process (e.g., the pre-chamber diagnostic shown in FIG. 4).

If the pre-chamber firing event is not requested at 304, method 300 proceeds to 306, and includes not operating the pre-chamber. In some examples, the pre-chamber firing event may not be requested while engine combustion is discontinued. For example, engine combustion may be discontinued while the engine is shut down or during a fuel-cut condition, such as when cylinder fueling is shut off while the vehicle speed decreases. In another example, the pre-chamber firing event may not be requested when the pre-chamber firing event has already been performed during the cylinder cycle. Not operating the pre-chamber may include not injecting fuel and air into the pre-chamber so that there is no air-fuel mixture for combustion within the pre-chamber. Without an air-fuel mixture to combust, not operating the pre-chamber may further include not activating the spark plug in the pre-chamber. Further, because combustion is not performed in the pre-chamber, not operating the pre-chamber may further include not providing an ignition source to the cylinder. In one example, the controller may adjust the pulse-widths of actuation signals to the fuel injector and the air injector such that no air-fuel mixture is injected into the pre-chamber. For example, no actuation signal may be sent to each of the fuel injector and the air injector. Further, the controller may adjust a control signal to the ignition system of the engine such that the spark plug in the pre-chamber is not activated.

If a pre-chamber firing event is requested at 304, method 300 proceeds to 308 and includes determining a desired pre-chamber AFR (e.g., a ratio of an amount of air injected to an amount of fuel injected into the pre-chamber). The desired AFR of the pre-chamber may be determined by the controller based on the AFR of the cylinder, such that combustion of an air-fuel mixture in the pre-chamber ignites an air-fuel mixture in the cylinder while minimizing emissions, as an example. For example, the controller may input the AFR of the cylinder and the current engine operating conditions, such as engine temperature and fuel composition, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometry combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry. As a further example, the controller may determine the desired AFR of the pre-chamber based on a pre-chamber diagnostic request, as elaborated in FIG. 4.

At 310, method 300 includes determining a desired pre-chamber spark timing for the pre-chamber firing event. Determining the desired pre-chamber spark timing may include determining when to ignite the air-fuel mixture in the pre-chamber relative to a position of a piston of the cylinder. Although a cylinder spark plug firing induces combustion in a cylinder of a traditional spark-ignition engine, in an engine with pre-chamber ignition, combustion in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired cylinder ignition timing. For example, the pre-chamber spark timing may be retarded relative to MBT timing to increase an exhaust gas temperature, while the pre-chamber spark timing may be advanced closer to MBT timing to increase a torque output of the cylinder. As another example, if the engine is borderline limited and is unable to operate at MBT timing, engine knock control may advance or retard the pre-chamber spark timing to operate the engine at the borderline limit. In one example, the controller may input one or more engine operating conditions (e.g., engine speed, engine load, the exhaust gas temperature, a borderline knock limit, and cylinder AFR) into one or more look-up tables, functions, or maps to determine the desired timing for the pre-chamber firing event. In another example, the controller may make a logical determination (e.g., regarding the pre-chamber spark timing) based on logic rules that are a function of the one or more engine operating conditions. In still another example, the controller may determine the desired timing for the pre-chamber firing event based on the pre-chamber diagnostic procedure of FIG. 4.

At 312, method 300 includes injecting air into the pre-chamber. In some examples, the air injected may be ambient air from an intake manifold of the engine, while in other examples, the pre-chamber air injector may provide onboard-generated $O_2$ or another combustible gas such as $H_2$. The controller may adjust an amount of air injected into the pre-chamber based on the desired AFR of the pre-chamber, as determined at 308, and the position of the piston in the cylinder. For example, the controller may input the engine operating conditions, including the piston position and the desired AFR of the pre-chamber, into a look-up table, algorithm, or map, which may output a desired air injection amount. As an example, the air injection event may not only provide air for combustion, but may also purge residual gases from a previous pre-chamber firing event from the pre-chamber. In another example, the air injection amount may be held substantially constant while the fuel injection amount is varied to compensate for changes in the desired AFR. For example, an amount of air injected may be approximately equal to a volume in the pre-chamber. In still other examples, the controller may determine the amount of air to inject according to a pre-chamber diagnostic procedure, as will be elaborated with respect to FIG. 4.

After determining the amount of air to be injected, the controller may inject the desired air amount by adjusting the pulse-width of an actuation signal sent to the pre-chamber air injector. Further, an injection pressure may be above a peak pressure in the cylinder. Because of this, some of the air injected may flow into the cylinder (e.g., due to the pressure in the cylinder being lower than the pressure in the pre-chamber). An amount of air injected to the pre-chamber that flows into the cylinder may be determined based on a pressure difference between the air injector pressure and the pressure in the cylinder and a size of opening(s) in the pre-chamber walls. This value may be used in adjusting cylinder fuel control, for example.

At 314, method 300 includes injecting fuel into the pre-chamber. The controller may adjust an amount of fuel injected into the pre-chamber based on the desired AFR of the pre-chamber, as determined at 308, and the amount of air injected at 312. For example, the controller may input the desired pre-chamber AFR into one or more look-up tables, functions, and maps, which may output a desired fuel amount to inject that will achieve the desired AFR in the pre-chamber. In another example, the controller may determine the amount of fuel to inject according to the pre-chamber diagnostic procedure described below with reference to FIG. 4. In one example, the controller may inject the desired fuel amount by adjusting the pulse-width of an actuation signal sent to the pre-chamber fuel injector, such as FPW2 shown in FIG. 1. The injected fuel may mix with the injected air (e.g., injected at 312) to form an air-fuel mixture.

At 316, method 300 includes actuating the pre-chamber spark plug to generate a spark in the pre-chamber. The controller may generate a control signal (e.g., signal SA) that is sent an ignition system (e.g., ignition system 88 of FIG. 1) to actuate the pre-chamber spark plug at the pre-chamber spark timing determined at 310. Generating the spark in the pre-chamber may cause the air-fuel mixture in the pre-chamber to combust, sending jets of hot gas and flame into the cylinder via a plurality of holes in the pre-chamber walls. When the cylinder also includes a combustible air-fuel mixture, the jets of hot gas and flame ignite the air-fuel mixture in the cylinder. After 316, method 300 may end.

In this way, the pre-chamber of a cylinder may be operated to ignite a first air-fuel mixture within the pre-chamber, which may further ignite a second air-fuel mixture in the cylinder. In some examples, method 300 may run continuously during nominal engine operation in order to continuously provide cylinder ignition when indicated. An engine with pre-chamber ignition may provide a higher power output and/or reduced fuel consumption relative to an engine without pre-chamber ignition, for example. Further, jets of flame and hot gas from the pre-chamber may cause the second air-fuel mixture to combust more fully and with a lower peak combustion temperature than a spark plug. Thus, in a pre-chamber ignition system, the second air-fuel mixture in the cylinder may be commanded lean relative to stoichiometry without a reduction in combustion stability, and without an increase in $NO_x$ emissions and/or combustion temperatures. With active air and fuel injection in the pre-chamber, the AFR of the pre-chamber may be predicted based on injection amounts of the air and fuel, which may increase ignition control, and active air injection may further purge the pre-chamber of residual gases from previous cylinder cycles, for example. As another example, actively injecting both air and fuel into the pre-chamber increases a control and an accuracy of the pre-chamber AFR compared with pre-chambers that use passive diffusion of air and/or fuel from the cylinder. As a result, the pre-chamber may more reliably operate over a wider range of engine operating conditions to provide cylinder ignition.

Despite the increased robustness of the active pre-chamber air and fuel injection system, in some examples, misfire may still occur in the pre-chamber, which causes a corresponding cylinder to misfire. The pre-chamber may misfire due to an overly lean AFR in the pre-chamber or pre-chamber ignition system degradation (e.g., spark plug fouling), for example. However, a controller (e.g., controller 12 of FIGS. 1 and 2) may be unable to distinguish pre-chamber misfire from misfire that occurs in the cylinder itself. Further, the cylinder may misfire even when the pre-chamber fires, such as due to an overly lean AFR in the cylinder or an ignition timing being retarded beyond a threshold, for example. As one example, the controller may use one or more sensors to determine that a misfire has occurred. In one example, misfire may be determined based on a signal PIP after a firing event. That is, if the engine crankshaft (e.g., crankshaft 140 shown in FIG. 1) does not accelerate following the firing event, it may be determined that combustion did not occur in the cylinder. In some examples, the controller may increment a misfire counter so that a diagnostic trouble code may be set and/or a vehicle operator alerted after a threshold number of misfires is reached so that a source of the misfires may be determined and addressed accordingly in order to prevent further engine system degradation.

However, because the misfire detection method mentioned above does not distinguish between pre-chamber misfire and cylinder misfire, the misfire source may not be easily determined. Further still, even if the misfire source is determined to be the pre-chamber, an entire pre-chamber assembly may be replaced during repair, which significantly increases repair costs compared with just changing out a conventional coil, spark plug, or injector. In other examples, an inaccurate pre-chamber AFR may affect a cylinder AFR, which may impact cylinder operation without causing pre-chamber misfire, such as by increasing vehicle emissions by deviating from stoichiometry. Methods for characterizing the firing event of the pre-chamber itself are desired in order to detect and correct air and/or fuel errors in the pre-chamber that may result in pre-chamber, and thus cylinder, misfire in order to reduce AFR related pre-chamber misfires.

Figure 4:
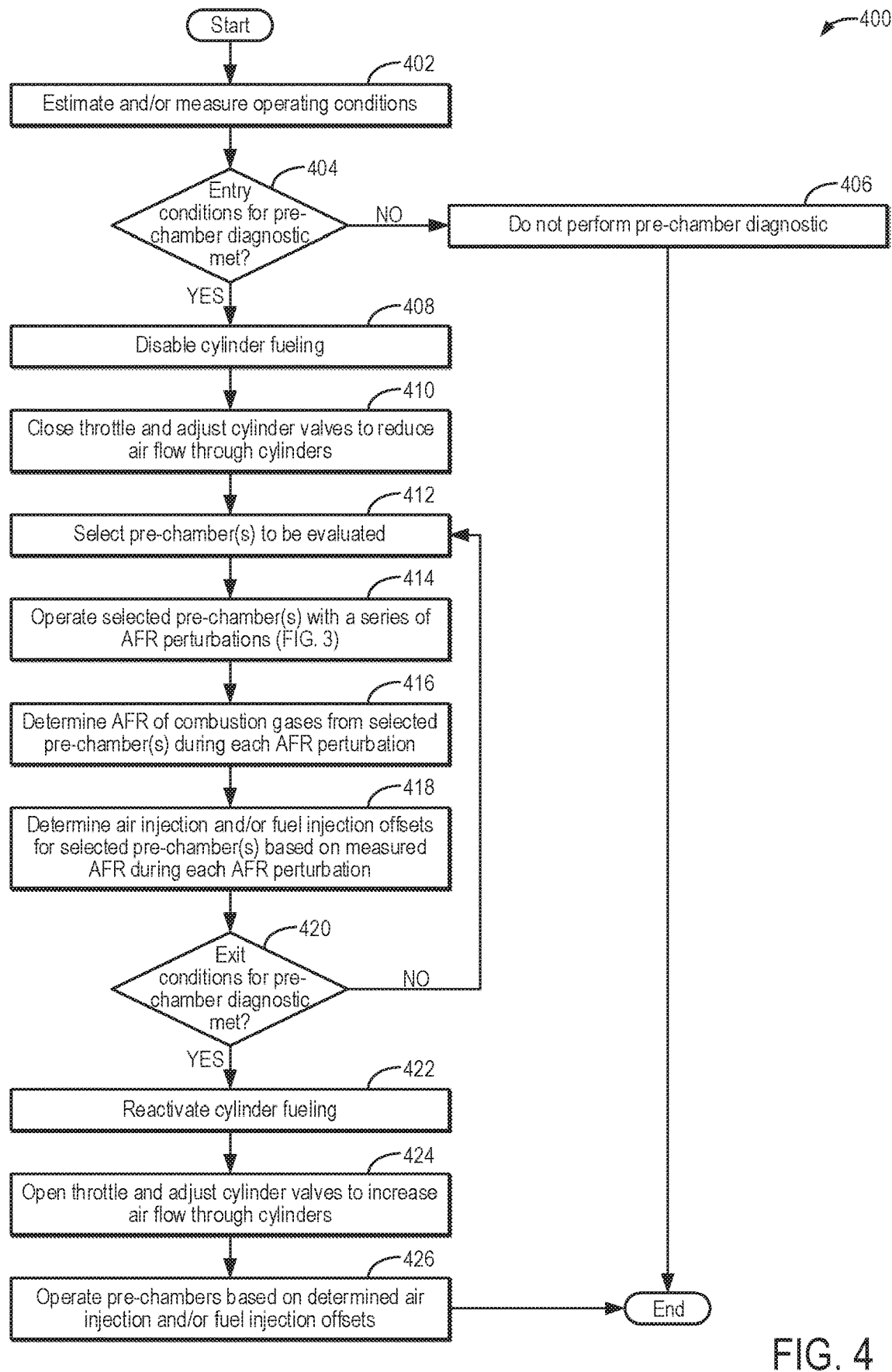
FIG. 4 depicts an example method for diagnosing and correcting air and/or fuel offsets in a pre-chamber of a cylinder.

Thus, FIG. 4, shows an example method for diagnosing and correcting air and/or fuel injection offsets in a pre-chamber of a cylinder in order to prevent pre-chamber misfire. Method 400 will be described with respect to engine system 200 shown in FIG. 2 and the cylinder configuration shown in FIG. 1, although method 400 may be applied in other systems that include pre-chamber ignition and a sensor for determining an exhaust gas AFR. Instructions for carrying out method 300 may be executed by a controller, such as controller 12 of FIGS. 1-2, based on instructions stored on a memory of the controller and in conjunction with signals received from sensors of the engine system, such as the sensors described above with reference to FIGS. 1-2. In particular, the controller may use output from one or more exhaust gas oxygen sensors, such as first UEGO sensor 228 and second UEGO sensor 229 shown in FIG. 2, to learn the air and/or fuel injection offsets of each pre-chamber. The controller may employ engine actuators of the engine system (e.g., intake valve timing actuator 101, exhaust valve timing actuator 103, throttle 62, cylinder fuel injector 66, pre-chamber fuel injector 96, pre-chamber spark plug 92, and pre-chamber air injector 94 shown in FIG. 1) to adjust engine operation according to the methods described below.

At 402, method 400 includes estimating and/or measuring operating conditions. The operating conditions may include, for example, vehicle speed, engine speed, engine load, an accelerator pedal position, a brake pedal position, and a position of a throttle (e.g., throttle position). The operating conditions may be measured by one or more sensors communicatively coupled to the controller or may be inferred based on available data. For example, the accelerator pedal position may be measured by an acceleration position sensor, such as acceleration pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. Similarly, the throttle position may be measured using a throttle position sensor coupled to the throttle.

At 404, method 400 includes determining if conditions for entering the pre-chamber diagnostic are met. The conditions for entering the pre-chamber diagnostic (e.g., entry conditions) include a fuel-cut event during which the engine remains operating at a non-zero speed, but fuel injection is temporarily discontinued. As such, combustion does not occur in the engine during the fuel-cut event. For example, the fuel-cut event may be triggered by one or more of the accelerator pedal not being depressed, the brake pedal being depressed, and the vehicle speed decreasing. The entry conditions may further include a pre-determined duration having elapsed since the pre-chambers were last evaluated for air injection and fuel injection errors. The pre-determined duration may be a non-zero time duration that has been calibrated to update pre-chamber fuel and air injection offsets at a rate over which change in the air and fuel injectors may occur. Further, in some examples, the entry conditions may also include an indication that cylinder misfire has occurred, such as a misfire counter reaching a threshold number. The threshold number may be a pre-calibrated, non-zero number that shows cylinder misfire is repeatedly occurring. In some examples, all of the entry conditions may be confirmed for the conditions for entering the pre-chamber diagnostic to be considered met. In other examples, the conditions for entering the pre-chamber diagnostic may be considered met when at least the fuel-cut event is confirmed.

If the entry conditions are not met, method 400 proceeds to 406 and includes not performing the pre-chamber diagnostic. As one example, the entry conditions may not be met when the fuel-cut condition is not confirmed, and thus, cylinder fueling may be maintained. With cylinder fueling maintained, each cylinder may continue to combust an air-fuel mixture, which may confound and/or prevent the pre-chamber diagnostic described in method 400. Following 406, method 300 ends. As one example, method 400 may be repeated as the operating conditions change so that the pre-chamber diagnostic may be performed responsive to the entry conditions being met.

If the entry conditions are instead met, method 400 proceeds to 408 and includes disabling cylinder fueling. Disabling cylinder fueling includes providing no fuel to each cylinder of the engine. For example, cylinder fuel injectors may be deactivated and may not be actuated to inject fuel. In some examples, the controller may disable fueling for all cylinders at the same time, while in other examples, the controller may first disable fueling for a first set of cylinders (e.g., first bank 215a of FIG. 2) and may then disable fueling for a second set of cylinders (e.g., second bank 215b of FIG. 2) after a pre-determined amount of time.

At 410, method 400 includes closing the throttle and adjusting cylinder valves to reduce air flow through the cylinders. For example, when the engine system includes the throttle, the controller may adjust a position of a throttle plate of the throttle via a throttle actuator such that air flow to the cylinders is partially or fully blocked, thus reducing air flow through the cylinders. As one example, adjusting the cylinder valves may include deactivating the cylinder intake valves such that the cylinder intake valves are kept fully closed throughout an engine cycle or a plurality of engine cycles. The cylinder intake valves may be kept closed, for example, via a cam profile switching mechanism in which an intake cam with no lift is used or by actuating a valve deactivator (e.g., a VDE actuator), as described above with respect to FIG. 1. At least some of the cylinder exhaust valves also may be kept fully closed while selected cylinder exhaust valves may continue to operate, as will be further described below at 412. Alternatively, all of the cylinder exhaust valves may continue to operate while the intake valves are deactivated.

In other examples, the engine may not include deactivatable valves. In such examples, adjusting the cylinder valves may include adjusting the cylinder intake valves and cylinder exhaust valves for a lowest possible air flow through the cylinder. For example, when the cam profile switching mechanism is included, an intake cam with a smallest lift and/or opening duration may be used. As another example, when a continuously variable valve lift system is included, the intake valves may be set for a smallest amount of lift possible to minimize air flow. As still another example, the intake cam may be positioned to retard an intake valve opening timing by a largest possible amount. For example, maximally retarding the intake valve opening timing may effectively reduce the air flow through the engine to near zero because the intake valve may open when a piston in the cylinder is moving up instead of down. Overall, the controller may reduce the air flow through the cylinders to a smallest possible amount of air flow, which in some examples, includes completely blocking the air flow through the cylinders (e.g., through at least intake valve deactivation). By reducing air flow through the cylinders, combustion gases from the pre-chambers may be evaluated with an increased signal-to-noise ratio.

At 412, method 400 includes selecting one or more pre-chambers to be evaluated. For example, each pre-chamber may be identified based on a cylinder number of the cylinder it ignites. The selection may be based on, for example, which pre-chamber or pre-chambers have not yet been evaluated. As an example, the pre-chambers may be evaluated in a pre-defined order stored in a memory of the controller. For example, the pre-defined order may be a firing sequence of the cylinders. As such, the controller may select the pre-chamber(s) to be evaluated by following the pre-defined order. In some examples, one pre-chamber may be selected per exhaust gas oxygen sensor available to measure combustion gases from pre-chamber firing. For example, when the engine system includes one exhaust gas oxygen sensor, only one pre-chamber may be selected for evaluation at a time. When the engine system includes two engine banks that each includes its own dedicated exhaust gas oxygen sensor, such as in engine system 200 of FIG. 2, one pre-chamber may be selected from each engine bank (e.g., a total of two pre-chambers). In examples where the engine system includes a dedicated exhaust gas oxygen sensor for every cylinder (e.g., an exhaust gas oxygen sensor coupled to an exhaust runner of each cylinder), selecting one or more pre-chambers to be evaluated at 412 may include selecting every pre-chamber, as the combustion gas from each pre-chamber firing may be individually measured.

At 414, method 400 includes operating the selected pre-chamber(s) with a series of AFR perturbations. Operating the selected pre-chamber(s) with the series of AFR perturbations may include adjusting pre-chamber air injection amounts and/or fuel injection amounts and igniting the resultant air-fuel mixture via the spark plug. Further, the pre-chamber(s) that are not currently selected are not operated. For example, pre-chamber air injection and fuel injection is disabled in the non-selected pre-chambers so that combustion is discontinued in the non-selected pre-chambers. Further still, the exhaust valves of at least the cylinder(s) with the selected pre-chamber(s) may be maintained active so that the combustion gases from the selected pre-chamber(s) may be exhausted from the cylinder(s).

As an example, the air injection amount may be held constant while the fuel injection amount is sequentially varied each firing event or each pre-determined number of firing events, referred to as a fuel injection sweep. As another example, the fuel injection amount may be held constant while the air injection amount is sequentially varied each firing event or each determined number of firing events, referred to as an air injection sweep. For example, the controller may perform both the fuel injection sweep and the air injection sweep, such as by first performing the air injection sweep and then performing the fuel injection sweep or by first performing the fuel injection sweep and then performing the air injection sweep. Because a volume of combustion gases produced by each pre-chamber firing event may be relatively small compared to that produced during a cylinder firing event, the pre-determined number of firing events may be stored in the memory of the controller and calibrated to produce an accurate exhaust gas oxygen sensor measurement of the resultant pre-chamber combustion gases. Additionally or alternatively, the pre-determined number may enable averaging of the exhaust gas oxygen sensor measurements.

As an example, during the fuel injection sweep, the controller may maintain a constant pulse width of an activation signal for the air injector while adjusting a pulse width of an actuation signal for the pre-chamber fuel injector (e.g., signal FPW2 shown in FIG. 1) for at least a subset of the AFR perturbations in the series. This may include, for example, adjusting the pulse width of the actuation signal for the pre-chamber fuel injector by a pre-determined amount for each AFR perturbation. As another example, during the air injection sweep, the controller may maintain a constant pulse width of the actuation signal for the pre-chamber fuel injector while adjusting the pulse width of the actuation signal for the air injector for at least a remaining subset of the AFR perturbations in the series. This may include, for example, adjusting the pulse width of the actuation signal for the air injector by a pre-determined amount for each AFR perturbation. The controller may continue adjusting the air injection amount or the fuel injection amount in this manner until the series of AFR perturbations is completed.

At 416, method 400 includes determining the AFR of combustion gases from the selected pre-chamber(s) during each AFR perturbation. For example, the controller may separately measure the combustion gases produced by each selected pre-chamber during operation with each of the AFR perturbations using the exhaust gas oxygen sensor(s). The AFR of the combustion gases from each selected pre-chamber during each AFR perturbation may be determined using the measurement from the corresponding exhaust gas oxygen sensor. As mentioned above at 312, the pre-chamber(s) may be selected such that each exhaust gas oxygen sensor receives exhaust gas from just one operating pre-chamber.

At 418, method 400 includes determining air injection and/or fuel injection offsets for the selected pre-chamber(s) based on the measured AFR during each AFR perturbation. For example, the controller may determine an expected AFR for each AFR perturbation based on commanded pre-chamber air and fuel injection amounts and compare the expected AFR to the determined (e.g., measured) AFR of the combustion gases for each AFR perturbation. Any difference between the expected AFR and the determined AFR of the combustion gases may be attributed to an air injection offset and/or a fuel injection offset based on how the difference changes for each AFR perturbation and further based on whether AFR perturbation is part of the air injection sweep or the fuel injection sweep. As an example, an air injection offset may result in a first characteristic relationship between the expected AFR and the determined AFR during the air injection sweep and during the fuel injection sweep, a fuel injection offset may result in a second characteristic relationship between the expected AFR and the determined AFR during the air injection sweep and during the fuel injection sweep, and a simultaneous fuel injection offset and air injection offset may result in a third characteristic relationship between the expected AFR and the determined AFR during the air injection sweep and during the fuel injection sweep.

In some examples, the controller may use one or more look-up tables stored in memory to determine a value of an air injection offset and a fuel injection offset for each selected pre-chamber. The one or more look-up tables may include pre-populated values for the difference between the expected AFR and the determined AFR for both the air injection sweep and the fuel injection sweep for a plurality of air injection offset and/or fuel injection offset values. The controller may input the determined difference between the expected AFR and the determined AFR for a given pre-chamber into the one or more look-up tables, which may output the air injection offset and the fuel injection offset for that pre-chamber. In some examples, the output values may be interpolated or extrapolated from the pre-populated values in the one or more look-up tables. Additionally or alternatively, the controller may input the determined difference between the expected AFR and the determined AFR for each AFR perturbation for a given pre-chamber into an algorithm that determines the air injection offset value and the fuel injection offset value that will result in the input data. In some examples, one or more of the determined offsets may be zero, indicating that the corresponding injector is accurately delivering the commanded amount of air or fuel.

At 420, method 400 includes determining if conditions for exiting the pre-chamber diagnostic (e.g., exit conditions) are met. As one example, the exit conditions may include the entry conditions described above at 404 no longer being met. As another example, the exit conditions may additionally or alternatively include all of the pre-chambers having been evaluated. Any or all of the exit conditions may be confirmed for the conditions for exiting the pre-chamber diagnostic to be considered met.

If conditions for exiting the pre-chamber diagnostic are not met, method 400 returns to 412 to select one or more pre-chambers to be evaluated (e.g., pre-chambers that have not yet been evaluated for learning air injection and/or fuel injection offsets). The newly selected pre-chamber(s) may then be operated with the series of AFR perturbations while the previously evaluated pre-chambers are deactivated. In this way, the pre-chamber diagnostic may be performed until all of the pre-chambers are evaluated or the entry conditions for performing the pre-chamber diagnostic are no longer met (e.g., the exit conditions are confirmed).

Returning to 420, if the conditions for exiting the pre-chamber diagnostic are met, method 400 proceeds to 422 and includes reactivating cylinder fueling. As an example, the cylinder fuel injectors may be actuated to provide a desired amount of fuel for the given engine conditions, such as to produce the demanded amount of torque. For example, the controller may determine a pulse width of an actuation signal for the cylinder fuel injectors (e.g., signal FPW1 shown in FIG. 1) using a look-up table, with the input being the demanded amount of torque and the output being the pulse width.

In some examples, the controller may modify (e.g., adjust) the desired amount of fuel based on the amount of fuel used during the pre-chamber diagnostic in order to maintain a desired AFR (e.g., stoichiometry) in the cylinder. For example, the controller may estimate an amount of residual fuel in the cylinder from the pre-chamber diagnostic and may adjust the pulse width of the actuation signal for the cylinder fuel injectors using a look-up table, with the input being the estimated amount of residual fuel in the cylinder from the pre-chamber diagnostic. For example, the desired amount of cylinder fuel may be decreased when residual gases from the pre-chamber are rich, and the desired amount of cylinder fuel may be increased when residual gases from the pre-chamber are lean.

In some examples, the controller may additionally or alternatively temporarily modify the desired amount of cylinder fuel based on an amount of air delivered to an emission control device (e.g., emission control device 70 of FIG. 2) during the fuel-cut event. For example, if any air has "slipped" through the system to the emission control device, the controller may momentarily provide rich fueling to return the emission control device back to an efficient conversion state.

Further, the controller may modify the desired amount of fuel based on an exhaust gas temperature, such as to decrease the exhaust gas temperature. For example, the controller may determine a desired decrease in exhaust gas temperature and may adjust the pulse width of the actuation signal for the cylinder fuel injectors based on the desired decrease in the exhaust gas temperature, such as by inputting the desired decrease in the exhaust gas temperature into a look-up table, algorithm, or function. In some examples, the controller may reactivate fueling for all cylinders at the same time, while in other examples, the controller may first reactivate fueling for the first set of cylinders (e.g., first bank 215*a* of FIG. 2) and may then reactivate fueling for the second set of cylinders (e.g., second bank 215*b* of FIG. 2) after a pre-determined amount of time.

At 424, method 400 includes opening the throttle and adjusting the cylinder valves to increase air flow through the cylinders. For example, when the throttle is included, the controller may adjust the position of the throttle plate to further open the throttle and provide air flow to the cylinders. The adjusted throttle position may be determined based on the demanded amount of torque, for example, such as using a look-up table or logic rules that that are a function of the demanded amount of torque. In some examples, the throttle may be gradually opened, while in other examples, the throttle may be directly opened to the determined throttle position.

Further, adjusting the cylinder valves may include activating the cylinder valves from a deactivated state such that the cylinder intake valves and exhaust valves open and closed at set timings during an engine cycle. Additionally or alternatively, adjusting the cylinder valves may include increasing an amount of valve lift and/or an opening duration in order to increase air flow through the cylinders. As an example, when the cam profile switching mechanism is included, the intake cam may be switched from a cam with no or little lift to a cam with a larger amount of lift. As another example, when a continuously variable valve lift system is included, the intake valves may be set for a nominal amount of lift for the given engine operating conditions, including the demanded amount of torque. In still another example, the intake cam position may be adjusted to a nominal position for a nominal intake valve opening timing. In some examples, the controller may further modify the amount of valve lift and/or the opening duration based on the amount of air and/or $O_2$ injected during the pre-chamber diagnostic. In a system including a continuously variable valve lift system, the controller may estimate the amount of air and/or $O_2$ injected during the pre-chamber diagnostic and may adjust a pulse width of a signal to an intake valve timing actuator (e.g., intake valve timing actuator 101) based on the estimated amount of air and/or $O_2$, for example. As another example, in a system including the cam profile switching mechanism, the controller may estimate the amount of air and/or $O_2$ injected, and the intake cam may be switched to a cam with a different amount of lift from the nominal amount of lift. Further, the controller may modify the amount of valve lift based on an exhaust gas temperature, such as to decrease the exhaust gas temperature.

In an alternative example, if torque is not yet demanded (e.g., the fuel-cut event remains active when the pre-chamber diagnostic is completed), air flow through the engine may continue to be reduced via the throttle and cylinder valve adjustments performed at 410 until torque is demanded. Upon the completion of the fuel-cut event, such as in response to driver-demanded torque, cylinder fueling may be reactivated (e.g., at 422) and the air flow through the engine may be increased (e.g., at 424).

At 426, method 400 includes operating the pre-chambers based on the determined air injection and/or fuel injection offsets. That is, the specific offsets learned for each pre-chamber may be applied to fuel injection control and air injection control for that pre-chamber in order to accurately inject a desired amount of fuel and a desired amount of air for each pre-chamber ignition event. For example, if a first pre-chamber has an air injection offset that increases the amount of air injected relative to a commanded amount of air, the air injection control for the first pre-chamber may include a first multiplier term that decreases the pulse width of the air injection actuation signal. Similarly, if a second pre-chamber has a fuel injection offset that decreases the amount of fuel injected relative to a commanded amount of fuel, the fuel injection control for the second pre-chamber may utilize a second multiplier term that increases the pulse width of the fuel injection actuation signal. Further, with refueling reactivated and nominal air flow in the engine cylinders, operating the pre-chambers may produce combustion in each engine cylinder. Method 400 then ends. As one example, method 400 may be repeated at a pre-determined frequency so that any changes to air injection and fueling errors that occur over time may be learned and compensated for.

Figure 5:
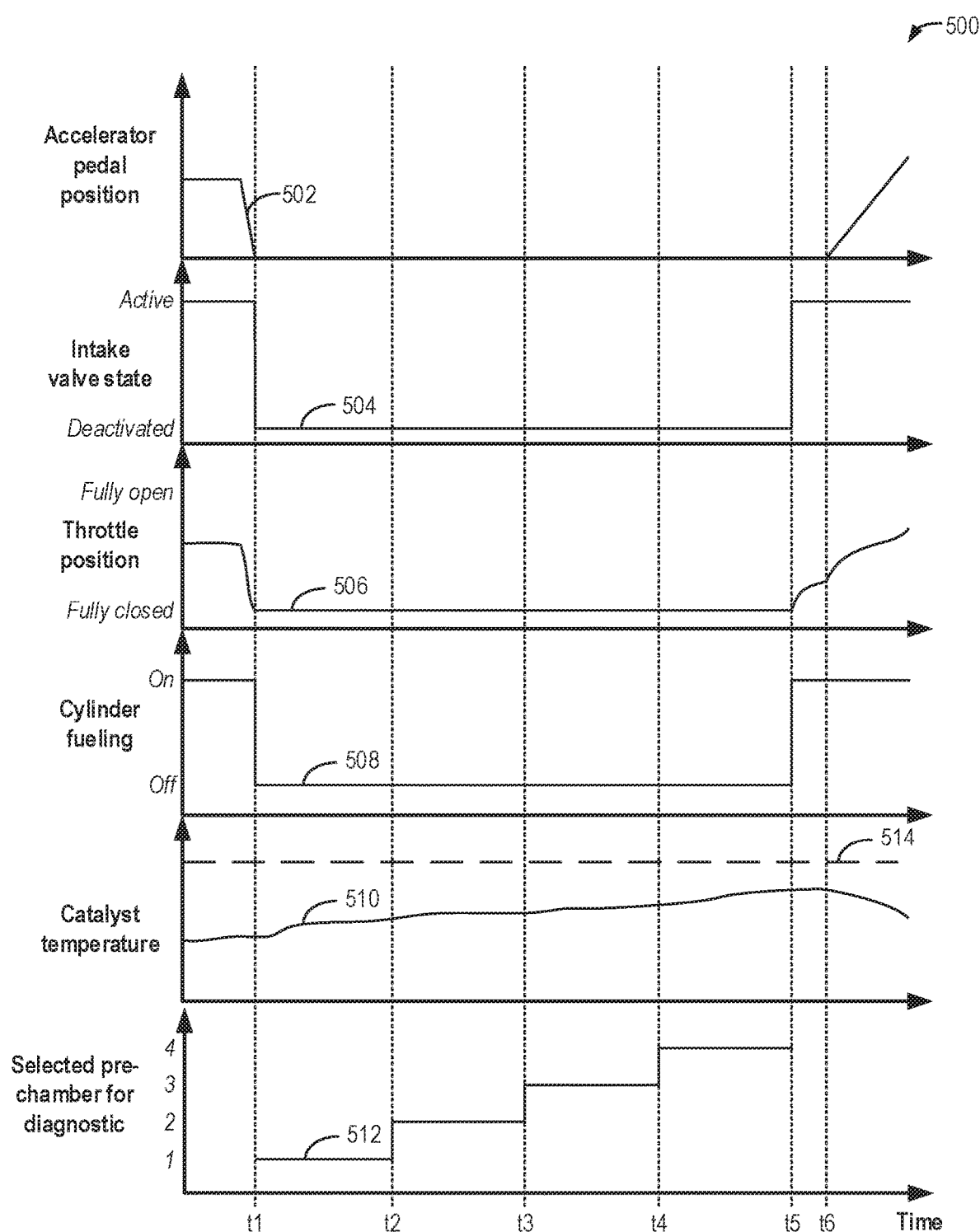
FIG. 5 shows a prophetic example timeline of engine cylinder adjustments for diagnosing pre-chamber injection offsets.

Next, FIG. 5 shows an example prophetic timeline 500 for adjusting engine operation to perform a pre-chamber diagnostic. The engine may be engine 10 shown in FIGS. 1-2, for example, and controlled by controller 12. An accelerator pedal position is shown in plot 502, an intake valve state is shown in plot 504, a throttle position is shown in plot 506, a cylinder fueling setting is shown in plot 508, a catalyst temperature is shown in plot 510, and a selected pre-chamber for the pre-chamber diagnostic is shown in plot 512. In examples where the engine includes two engine banks, such as shown in FIG. 2, plot 512 may represent the pre-chambers of one bank of the engine. Further, an upper catalyst temperature threshold for performing the pre-chamber diagnostic is shown by a dashed line 514.

For all of the above, the horizontal axis represents time, with time increasing along the horizontal axis from left to right. The vertical axis represents each labeled parameter. For plots 502, 506 and 512, a magnitude of the parameter increases up the vertical axis from bottom to top. For plot 502, an increase in the accelerator pedal position corresponds to an increase in a driver demand for acceleration, while a decrease in the accelerator pedal position corresponds to a decrease in the driver demand for acceleration. The throttle position (plot 506) is shown from fully open to fully closed, as labeled. For plot 504, the vertical axis shows whether the intake valve state is active or deactivated, as labeled. For plot 508, the vertical axis shows whether the cylinder fueling is on or off, as labeled. For plot 512, the vertical axis shows four possible pre-chambers that may be selected for the pre-chamber diagnostic: a first pre-chamber ("1"), a second pre-chamber ("2"), a third pre-chamber ("3"), or a fourth pre-chamber ("4"), with each of the four pre-chambers included in one cylinder of the engine. As such, the example timeline 500 will be described for a four-cylinder bank of an engine, although in other examples, similar adjustments may be applied for other numbers of cylinders. Further, timeline 500 is described for an engine having deactivatable intake valves. The deactivated intake valve state may be construed to represent minimum intake valve opening conditions for systems that do not include fully deactivatable intake valves.

Prior to t1, the engine is operating in a nominal combustion mode, with the engine operated to meet a driver-demanded torque determined from the accelerator pedal position (plot 502). In particular, the intake valve state (plot 504) is active, enabling the intake valves to open and close according to an intake valve timing set by the controller. The throttle position (plot 506) is partially open in proportion to the accelerator pedal position, enabling air flow from the intake manifold to the intake valves of the cylinders. Because the intake valves are active and the throttle is (partially) open, air flow is provided to the engine cylinders. The cylinder fueling (plot 508) is on, and fuel injected into the engine cylinders mixes with air inducted through the intake valves, providing an air-fuel mixture for combustion within each cylinder. The controller also operates the pre-chambers of each cylinder of the engine to combust an air-fuel mixture within each pre-chamber to provide an ignition source for the air-fuel mixture in the cylinders, such as according to the method elaborated in FIG. 3. Thus, the air-fuel mixture provided to the cylinder is combusted by jets of flame and hot gas from a combustion event in the corresponding pre-chamber, providing torque to the engine. Further, the catalyst temperature (plot 510) is below the upper catalyst temperature threshold (dashed line 514).

Just before t1, the accelerator pedal position (plot 502) decreases rapidly due to a driver tip-out event, and the throttle position also decreases accordingly. As a result, a fuel-cut event is performed at time t2 due to the driver-requested decrease in speed and/or acceleration. During a fuel-cut event, the engine remains operating at a non-zero speed, but fuel injection is temporarily discontinued. As such, combustion does not occur in the engine during the fuel-cut event. Therefore, at time t1, cylinder fueling is discontinued (plot 508).

Due to the fuel-cut event, the controller assesses whether remaining entry conditions for performing the pre-chamber diagnostic are met at time t1. As discussed above with respect to FIG. 4, along with the fuel-cut event, the entry conditions for the pre-chamber diagnostic may further include the catalyst temperature being below the upper catalyst temperature threshold shown by dashed line 514. Because the catalyst temperature (plot 510) is below the upper catalyst temperature threshold (dashed line 514), the entry conditions for the pre-chamber diagnostic are considered met. In addition to disabling the cylinder fueling (plot 508), entering the pre-chamber diagnostic includes closing the throttle (plot 506) and deactivating the cylinder intake valves (plot 504) in order to reduce air flow through the engine. In particular, deactivating the cylinder intake valves fully blocks air induction into the cylinder through the intake valves.

Between t1 and t2, the controller performs the pre-chamber diagnostic for the first pre-chamber (plot 512). As described above with respect to FIG. 4, the pre-chamber diagnostic includes combusting an air-fuel mixture in a selected pre-chamber and measuring the resulting combustion gases with an exhaust gas oxygen sensor to determine an air-fuel ratio of the combustion gases. In the example of timeline 500, one pre-chamber is selected at a time because one exhaust gas oxygen sensor is available for measuring pre-chamber combustion gases (e.g., first UEGO sensor 228 or second UEGO sensor 229 of FIG. 2). Thus, while the first pre-chamber is selected, the first pre-chamber is operated while the second, third, and fourth pre-chambers are deactivated (e.g., without air and fuel provided for combustion). During each pre-chamber diagnostic, the controller commands a series of AFR perturbations and determines a fuel injection offset and an air injection offset based on the differences between the commanded pre-chamber AFRs and the determined (e.g., measured) pre-chamber AFRs. If a non-zero fuel injection offset is detected, the controller may adjust fueling to correct for the fuel injection offset. If a non-zero air injection offset is detected, the controller may adjust fueling to correct for the air injection offset. These AFR perturbations and subsequent corrections are shown in more detail in FIGS. 6-9. Further, due to the repeated pre-chamber firings commanded during the pre-chamber diagnostic, the catalyst temperature (plot 510) increases between t1 and t2.

Upon completion of the series of AFR perturbations in the first pre-chamber, at t2, the controller selects the second pre-chamber for the pre-chamber diagnostic (plot 512). Between t2 and t3, the controller commands the series of AFR perturbations in the second pre-chamber while monitoring the measured AFR based on the output from the exhaust gas oxygen sensor to determine and correct non-zero injection offsets. Further, the catalyst temperature (plot 510) continues to increase between t2 and t3.

At t3, the controller selects the third pre-chamber for the pre-chamber diagnostic (plot 512). Similar to the pre-chamber diagnostic for the first and the second pre-chambers, the controller commands the series of AFR perturbations while monitoring the measured AFR based on the output from the exhaust gas oxygen sensor, and may further adjust fueling and/or air supply to correct a detected non-zero injection offset. The catalyst temperature (plot 510) continues to increase between t3 and t4.

At t4, the controller selects the fourth pre-chamber for the pre-chamber diagnostic (plot 512). Following the diagnostic process outlined in FIG. 4, the controller commands the series of AFR perturbations, compares expected AFR values to measured AFR values, and determines whether non-zero fueling and/or air injection errors are present due to injection offsets. If non-zero injection offsets are detected, the controller may adjust injection to compensate for the offsets and reduce the injection errors. Further, the catalyst temperature (plot 510) continues to increase between t4 and t5 without exceeding the upper catalyst temperature threshold (dashed line 514).

At t5, the diagnostic for the fourth pre-chamber ends, and no pre-chamber is selected for the diagnostic (plot 512)

because all four of the pre-chambers have been evaluated. In response, the pre-chamber diagnostic ends, and exit conditions for the pre-chamber diagnostic are met. In response, the intake valves are activated (plot 504), and the throttle position (plot 506) increases from the fully closed position to enable air flow through the engine. Further, in the example of timeline 500, cylinder fueling (plot 508) is commenced, although in other examples, the fuel-cut condition may be continued until additional conditions for exiting the fuel-cut condition are met (such as a driver tip-in event, engine speed decreasing below a threshold speed, etc.).

At time t6, the accelerator pedal position (plot 502) increases, indicating a driver demand for increased engine speed and/or torque. Based on this request, the throttle position is further increased (plot 506) to increase air flow through the engine to meet the increased driver demand. An amount of fuel injected during the active cylinder fueling may be adjusted accordingly based on an amount of air inducted and a desired operating AFR, for example.

Turning now to FIGS. 6-9, four prophetic example timelines show example adjustments to pre-chamber operation during and after a pre-chamber diagnostic. For example, each timeline may represent example adjustments and measurements made while operating one pre-chamber to combust a variable air-fuel mixture during the pre-chamber diagnostic. The different timelines generally and non-exclusively represent different examples of adjustments that may be performed and results that may be obtained during the pre-chamber diagnostic. Further, each timeline may represent results from a same pre-chamber at different points in time, results from different pre-chambers of one engine obtained during a same execution of the pre-chamber diagnostic, or results from pre-chambers unrelated to each other. Each of FIGS. 6-9 shows a commanded pre-chamber air injection amount, a commanded pre-chamber fuel injection amount, an expected AFR of pre-chamber combustion gases (e.g., determined based on the commanded pre-chamber air injection amount and the commanded pre-chamber fuel injection amount), and an actual AFR of the pre-chamber combustion gases (e.g., determined based on exhaust gas oxygen sensor measurements).

Figure 6:
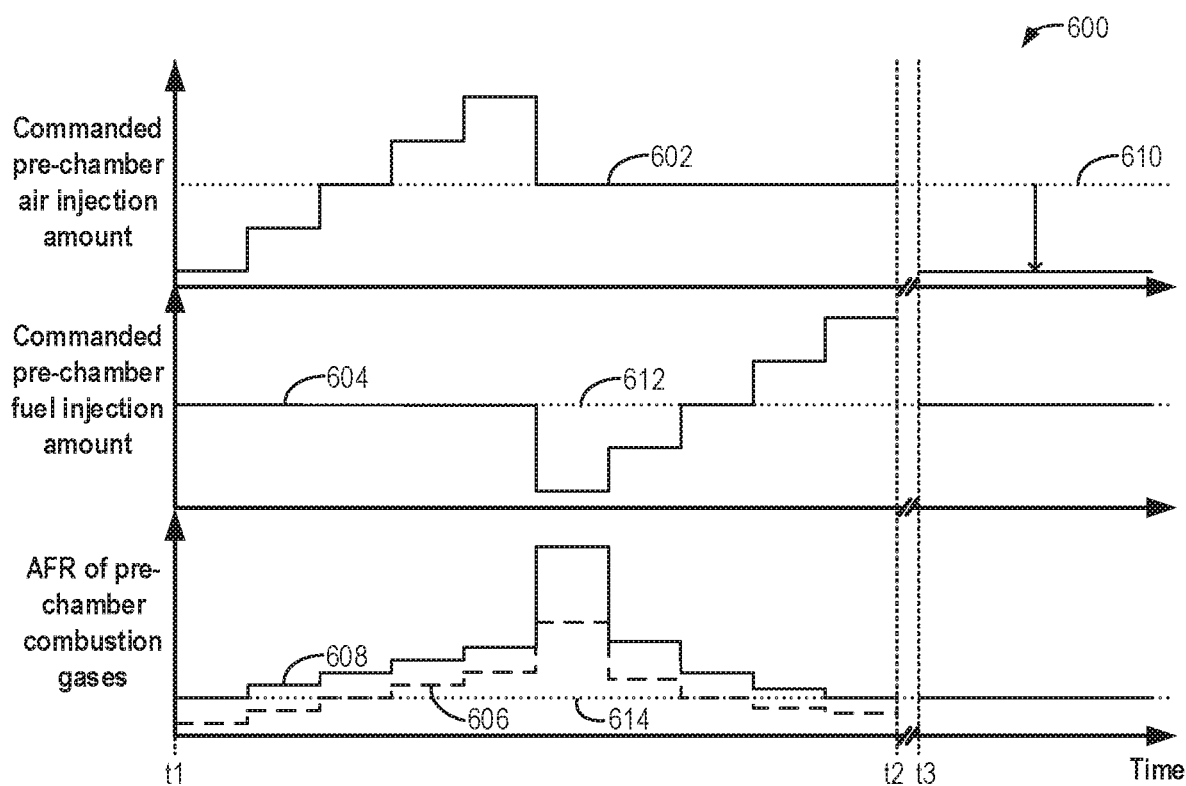
FIGS. 6-9 show prophetic example timelines showing adjustments to a pre-chamber air injector and a pre-chamber fuel injector to diagnose and correct injection offsets.

Turning first to FIG. 6, a first example timeline 600 shows adjustments to the pre-chamber operation during and after the pre-chamber diagnostic. Specifically, the commanded pre-chamber air injection amount is shown in plot 602, the commanded pre-chamber fuel injection amount is shown in plot 604, the expected AFR of the pre-chamber combustion gases is shown in dashed plot 606, and the actual AFR of the pre-chamber combustion gases is shown in plot 608. For all of the above, the horizontal axis represents time, with time increasing along the horizontal axis from left to right. The vertical axis represents each labeled parameter. Further, a nominal air injection amount is shown by dotted line 610, a nominal fuel injection amount is shown by dotted line 612, and a nominal AFR of the pre-chamber combustion gases (e.g., determined from the nominal air injection amount and the nominal fuel injection amount) is shown by dotted line 614. Although the nominal air injection amount, the nominal fuel injection amount, and the nominal AFR are shown as straight lines, note that values of each may change based on operating conditions. Thus, the nominal values provide a relative reference for the adjustments during and after the pre-chamber diagnostic.

During the pre-chamber diagnostic, the pre-chamber is operated with a series of AFR perturbations beginning at time t1 and lasting until time t2. In the example shown, the commanded pre-chamber fuel injection amount (plot 604) is held at the nominal fuel injection amount (dotted line 612) for a first half of the series while the commanded pre-chamber air injection amount (plot 602) is adjusted, and then the commanded pre-chamber fuel injection amount (plot 604) is adjusted while the commanded pre-chamber air injection amount (plot 602) is held at the nominal air injection amount (dotted line 610) for a second half of the series. Thus, one of the commanded pre-chamber air injection amount and the commanded pre-chamber fuel injection amount is sequentially adjusted during the series of AFR perturbations.

During the first half of the series of AFR perturbations, referred to herein as an air injection sweep, the commanded pre-chamber air injection amount (plot 602) is swept from amounts lower than the nominal air injection amount (dotted line 610) to amounts higher than the nominal air injection amount in a stepwise fashion while the commanded pre-chamber fuel injection amount (plot 604) remains at the nominal fuel injection amount (dotted line 612). In the specific example shown, the commanded pre-chamber air injection amount changes by a same amount during each AFR perturbation, and each different commanded pre-chamber air injection amount during the air injection sweep is maintained for a same duration. However, in other examples, the commanded pre-chamber air injection amount may change by different amounts between some or all of the AFR perturbations in the air injection sweep, and some or all of the different pre-chamber air injection amounts may be maintained for differing durations.

Because the commanded pre-chamber air injection amount (plot 602) begins lower than the nominal pre-chamber air injection amount (dotted line 610) and increases to above the nominal air injection amount in the example air injection sweep shown in timeline 600, the expected AFR of the pre-chamber combustion gases (dashed line 606) begins below the nominal AFR (dotted line 614), equals the nominal AFR when the commanded air injection amount is equal to the nominal air injection amount, and increases above the nominal AFR when the commanded air injection amount increases above the nominal air injection amount. In contrast, the actual AFR of the pre-chamber combustion gases (plot 608) is greater than the expected AFR (dashed plot 606) during each commanded air injection amount during the air injection sweep, which could be the result of more air being injected than commanded and/or less fuel being injected than commanded.

During the second half of the series of AFR perturbations, referred to herein as a fuel injection sweep, the commanded pre-chamber fuel injection amount (plot 604) is swept from amounts lower than the nominal pre-chamber fuel injection amount (dotted line 612) to amounts higher than the nominal fuel injection amount in a stepwise fashion while the commanded pre-chamber air injection amount (plot 602) remains at the nominal air injection amount (dotted line 610). In the specific example shown, the commanded pre-chamber fuel injection amount (plot 604) changes by a same amount during each stepwise change during the fuel injection sweep, and each different commanded pre-chamber fuel injection amount is maintained for a same duration. However, in other examples, the commanded pre-chamber fuel injection amount may change by different amounts between some or all of the AFR perturbations during the fuel injection sweep, and some or all of the different pre-chamber fuel injection amounts may be maintained for differing durations.

Because the commanded fuel injection amount (plot 604) begins lower than the nominal fuel injection amount (dotted line 612) and increases to above the nominal fuel injection amount in the example fuel injection sweep shown in timeline 600, the expected AFR of the pre-chamber combustion gases (dashed line 606) begins above the nominal AFR (dotted line 614), equals the nominal AFR when the commanded fuel injection amount is equal to the nominal fuel injection amount, and decreases below the nominal AFR when the commanded fuel injection amount increases above the nominal fuel injection amount. The actual AFR of the pre-chamber combustion gases (plot 608) remains greater than the expected AFR (dashed plot 606) during each commanded fuel injection amount during the fuel injection sweep and does not decrease below the nominal AFR (dotted line 614).

At time t2, the controller uses the difference between the expected AFR of the pre-chamber combustion gases (dashed plot 606) and the actual AFR of the pre-chamber combustion gases (plot 608) during each AFR perturbation in the series to determine whether more air is being injected than commanded, less fuel is being injected than commanded, or both. As described with respect to FIG. 4, the controller may input the difference between the expected AFR and the actual AFR for each AFR perturbation performed between time t1 and time t2 into one or more look-up tables and/or algorithms, which may output zero or non-zero pre-chamber air injection and fuel injection offsets. In the particular example of timeline 600, the difference between the expected AFR (dashed plot 606) and the actual AFR (plot 608) is the same for each AFR perturbation during the air injection sweep, while the difference between the expected AFR (dashed plot 606) and the actual AFR (plot 608) varies during the fuel injection sweep. For example, the difference between the expected AFR of the pre-chamber combustion gases (dashed plot 606) and the actual AFR of the pre-chamber combustion gases (plot 608) is greatest at the beginning of the fuel injection sweep, when the commanded pre-chamber fuel injection amount (plot 605) is the smallest of the data set, and gradually decreases as the commanded pre-chamber fuel injection amount increases. This relationship between the expected AFR and the actual AFR, wherein the difference is constant during the air injection sweep and predictably varies during the fuel injection sweep, may be characteristic of a non-zero air injection offset and no fuel injection offset.

Thus, in example timeline 600, the pre-chamber fuel injection offset is zero, indicating that the pre-chamber fuel injector is accurately delivering the commanded amount of fuel, while the pre-chamber air injection offset is a positive, non-zero value that indicates the pre-chamber air injector is delivering more air than commanded. Therefore, when nominal pre-chamber operation commences at time t3 (which is some duration after time t2), the commanded pre-chamber fuel injection amount (plot 604) is maintained at the nominal fuel injection amount (dotted line 612) while the commanded pre-chamber air injection amount (plot 602) is decreased from the nominal pre-chamber air injection amount (dashed line 610) to compensate for the determined air injection offset value. As a result, the actual AFR of the pre-chamber combustion gases (plot 608) is expected to be equal to the nominal AFR (dotted line 614).

Figure 7:
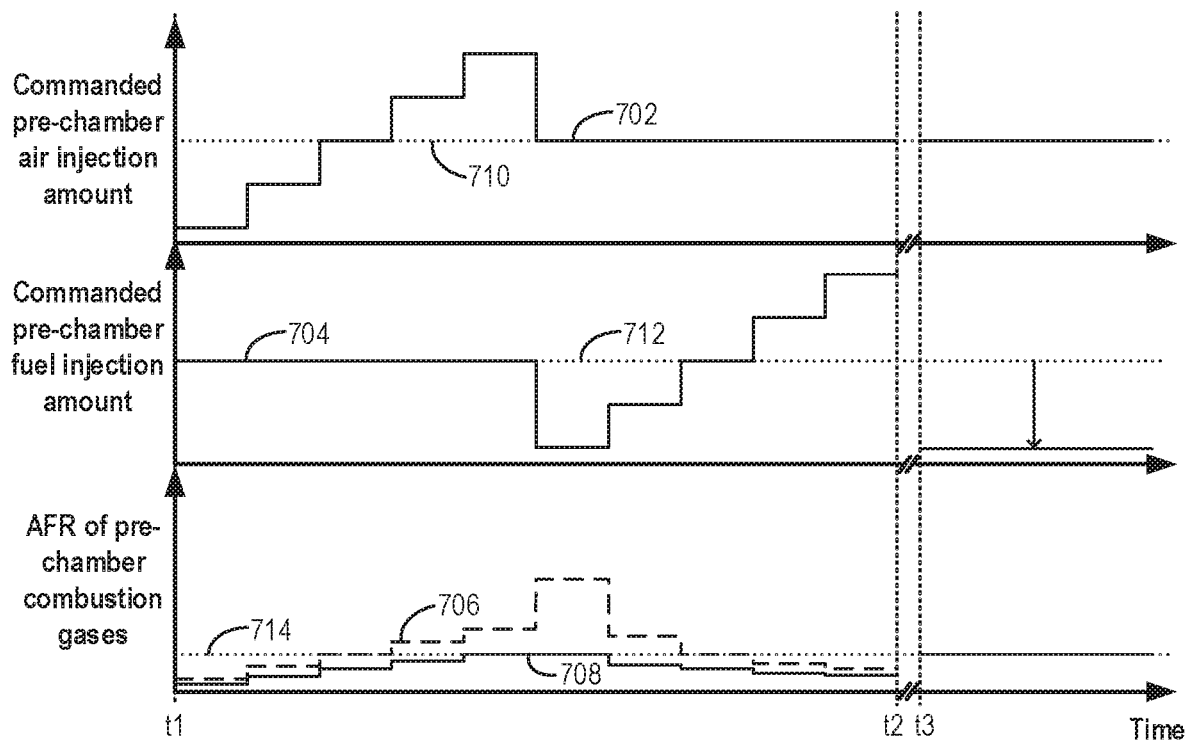

Continuing to FIG. 7, a second example timeline 700 shows adjustments to pre-chamber operation during and after the pre-chamber diagnostic. Second example timeline 700 is substantially identical to first example timeline 600 of FIG. 6 except for the differences that will be described below. Thus, FIG. 7 is numbered similarly to FIG. 6, with the commanded pre-chamber air injection amount shown in plot 702, the commanded pre-chamber fuel injection amount shown in plot 704, the expected AFR of the pre-chamber combustion gases shown in dashed plot 706, the actual AFR of the pre-chamber combustion gases shown in plot 708, the nominal air injection amount shown by dotted line 710, the nominal fuel injection amount shown by dotted line 712, and the nominal AFR of the pre-chamber combustion gases shown by dotted line 714. The series AFR perturbations performed between time t1 and time t2 of timeline 700 are the same as those performed between time t1 and time t2 of timeline 600 of FIG. 6 and will not be re-described.

During the air injection sweep, the actual AFR of the pre-chamber combustion gases (plot 708) is less than the expected AFR of the pre-chamber combustion gases (dashed plot 706) in the example of timeline 700, which could be the result of less air being injected than commanded and/or more fuel being injected than commanded. In particular, a difference between the expected AFR (dashed plot 706) and the actual AFR (plot 708) increases as the commanded pre-chamber air injection amount (plot 702) increases. During the fuel injection sweep, the actual AFR of the pre-chamber combustion gases (plot 708) remains less than the expected AFR of the pre-chamber combustion gases (dashed plot 706), with the difference between the expected AFR (dashed plot 706) and the actual AFR (plot 708) decreasing as the commanded pre-chamber fuel injection amount (plot 704) increases. Further, the actual AFR of the pre-chamber combustion gases (plot 708) is the same for the first AFR perturbation during the fuel injection sweep, when the commanded pre-chamber fuel injection amount (plot 704) is the lowest and the commanded pre-chamber air injection amount (plot 702) is nominal, as for the last AFR perturbation during the air injection sweep, when the commanded pre-chamber air injection amount (plot 702) is the highest and the commanded pre-chamber fuel injection amount (plot 704) is nominal.

At time t2, the controller uses the difference between the expected AFR of the pre-chamber combustion gases (dashed plot 706) and the actual AFR of the pre-chamber combustion gases (plot 708) during each AFR perturbation in the series to determine whether less air is being injected than commanded (e.g., a negative non-zero air injection offset), more fuel is being injected than commanded (e.g., a positive non-zero fuel injection offset), or both, as elaborated above with respect to FIGS. 4 and 6. In the particular example of timeline 700, the relationship between the expected AFR and the actual AFR, wherein the difference increases as the commanded air injection amount increases during the air injection sweep and decreases as the commanded fuel injection amount decreases during the fuel injection sweep, may be characteristic of a non-zero fuel injection offset and no air injection offset.

Thus, in example timeline 700, the pre-chamber air injection offset is zero, indicating that the pre-chamber air injector is accurately delivering the commanded amount of air, while the pre-chamber fuel injection offset is a positive, non-zero value that indicates the pre-chamber fuel injector is delivering more fuel than commanded. Therefore, when nominal pre-chamber operation commences at time t3 (which is some duration after time t2), the commanded pre-chamber air injection amount (plot 702) is maintained at the nominal air injection amount (dotted line 710) while the commanded pre-chamber fuel injection amount (plot 704) is decreased from the nominal pre-chamber fuel injection amount (dashed line 712) to compensate for the determined fuel injection offset value. As a result, the actual AFR of the pre-chamber combustion gases (plot 708) is expected to be equal to the nominal AFR (dotted line 714).

Figure 8:
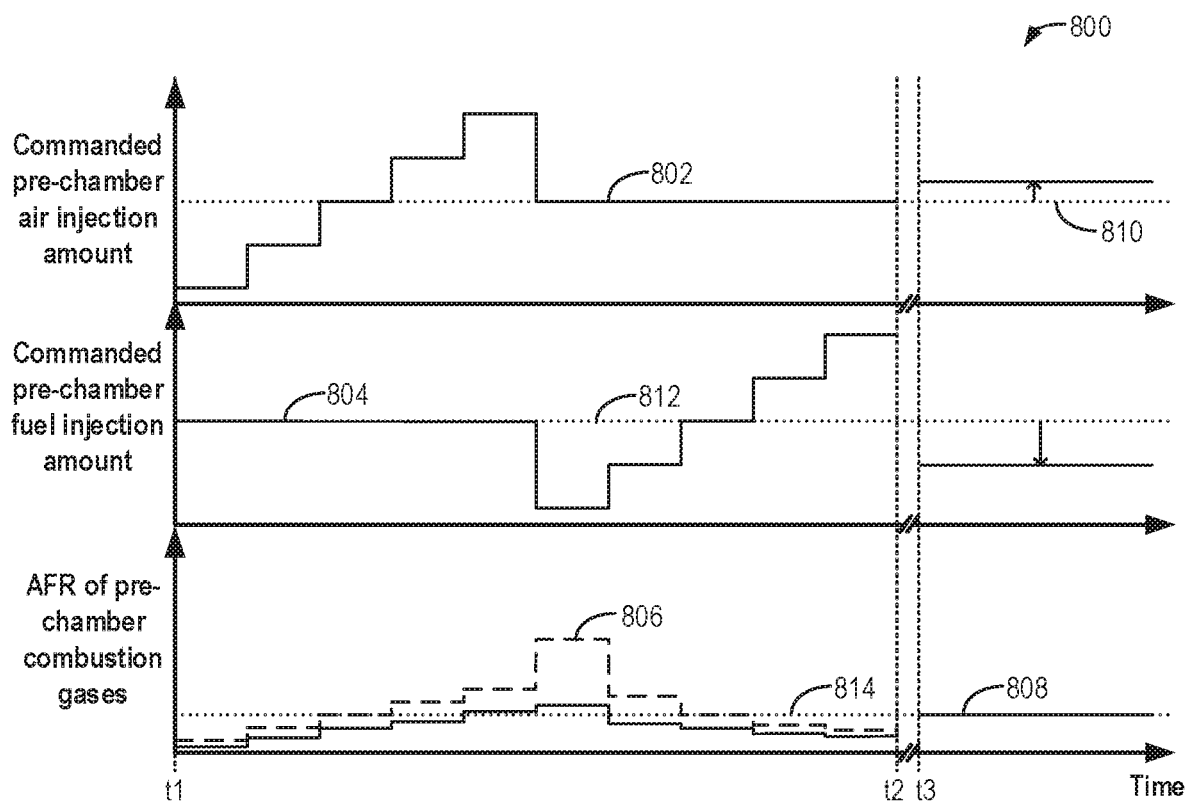

Continuing to FIG. 8, a third example timeline 800 shows adjustments to pre-chamber operation during and after the pre-chamber diagnostic. Third example timeline 800 is substantially identical to first example timeline 600 of FIG. 6 and second example timeline 700 of FIG. 7 except for the differences that will be described below. Thus, FIG. 8 is numbered similarly to FIGS. 6-7, with the commanded pre-chamber air injection amount shown in plot 802, the commanded pre-chamber fuel injection amount shown in plot 804, the expected AFR of the pre-chamber combustion gases shown in dashed plot 806, the actual AFR of the pre-chamber combustion gases shown in plot 808, the nominal air injection amount shown by dotted line 810, the nominal fuel injection amount shown by dotted line 812, and the nominal AFR of the pre-chamber combustion gases shown by dotted line 814. The series AFR perturbations performed between time t1 and time t2 of timeline 800 are the same as those performed between time t1 and time t2 of timeline 600 of FIG. 6 and will not be re-described.

During the air injection sweep, the actual AFR of the pre-chamber combustion gases (plot 808) is less than the expected AFR of the pre-chamber combustion gases (dashed plot 806) in the example of timeline 800, which could be the result of less air being injected than commanded and/or more fuel being injected than commanded. In particular, a difference between the expected AFR (dashed plot 806) and the actual AFR (plot 808) increases as the commanded pre-chamber air injection amount (plot 802) increases. During the fuel injection sweep, the actual AFR of the pre-chamber combustion gases (plot 808) remains less than the expected AFR of the pre-chamber combustion gases (dashed plot 806), with the difference between the expected AFR (dashed plot 806) and the actual AFR (plot 808) decreasing as the commanded pre-chamber fuel injection amount (plot 804) increases. Further, the actual AFR of the pre-chamber combustion gases (plot 808) is higher for the first AFR perturbation during the fuel injection sweep, when the commanded pre-chamber fuel injection amount (plot 804) is the lowest and the commanded pre-chamber air injection amount (plot 802) is nominal, than for the last AFR perturbation during the air injection sweep, when the commanded pre-chamber air injection amount (plot 802) is the highest and the commanded pre-chamber fuel injection amount (plot 804) is nominal.

At time t2, the controller uses the difference between the expected AFR of the pre-chamber combustion gases (dashed plot 806) and the actual AFR of the pre-chamber combustion gases (plot 808) during each AFR perturbation in the series to determine whether less air is being injected than commanded (e.g., a negative non-zero air injection offset), more fuel is being injected than commanded (e.g., a positive non-zero fuel injection offset), or both, as elaborated above with respect to FIGS. 4 and 6. In the particular example of timeline 800, the relationship between the expected AFR and the actual AFR, wherein the difference increases as the commanded air injection amount increases during the air injection sweep and decreases as the commanded fuel injection amount decreases during the fuel injection sweep, may be characteristic of a non-zero fuel injection offset and non-zero air injection offset. For example, the relationship is similar but different than the relationship shown in timeline 700 of FIG. 7 due to the non-zero air injection offset and a different non-zero fuel injection offset.

Thus, in example timeline 800, the pre-chamber air injection offset is a negative, non-zero value that indicates the pre-chamber air injector is delivering less air than commanded, while the pre-chamber fuel injection offset is a positive, non-zero value that indicates the pre-chamber fuel injector is delivering more fuel than commanded. Therefore, when nominal pre-chamber operation commences at time t3 (which is some duration after time t2), the commanded pre-chamber air injection amount (plot 802) is increased from the nominal air injection amount (dotted line 810) to compensate for the determined air injection offset value while the commanded pre-chamber fuel injection amount (plot 804) is decreased from the nominal pre-chamber fuel injection amount (dashed line 812) to compensate for the determined fuel injection offset value. As a result, the actual AFR of the pre-chamber combustion gases (plot 808) is expected to be equal to the nominal AFR (dotted line 814).

Figure 9:
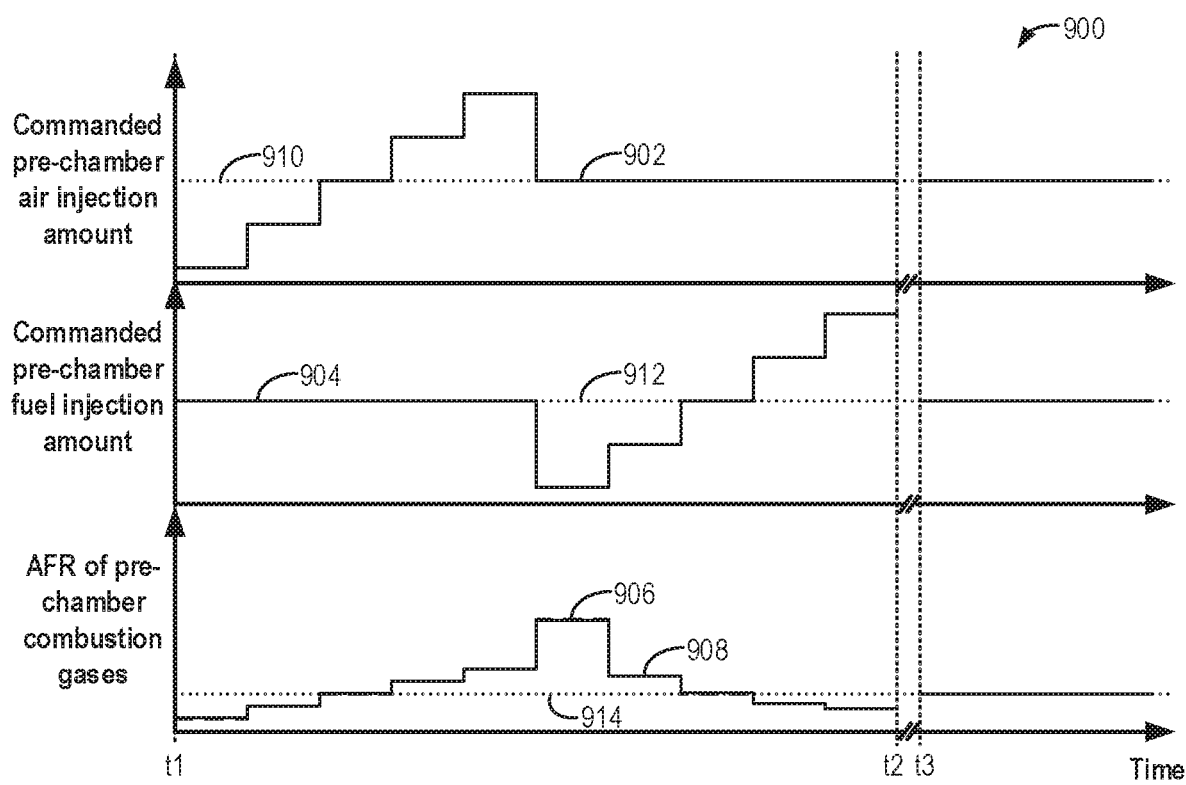

Continuing to FIG. 9, a fourth example timeline 900 shows adjustments to pre-chamber operation during and after the pre-chamber diagnostic. Fourth example timeline 900 is substantially identical to example timelines 600, 700, and 800 of FIGS. 6-8, respectively, except for the differences that will be described below. Thus, FIG. 9 is numbered similarly to FIGS. 6-8, with the commanded pre-chamber air injection amount shown in plot 902, the commanded pre-chamber fuel injection amount shown in plot 904, the expected AFR of the pre-chamber combustion gases shown in dashed plot 906, the actual AFR of the pre-chamber combustion gases shown in plot 908, the nominal air injection amount shown by dotted line 910, the nominal fuel injection amount shown by dotted line 912, and the nominal AFR of the pre-chamber combustion gases shown by dotted line 914. The series AFR perturbations performed between time t1 and time t2 of timeline 900 are the same as those performed between time t1 and time t2 of timeline 600 of FIG. 6 and will not be re-described.

During the air injection sweep, the actual AFR of the pre-chamber combustion gases (plot 908) is approximately the same as the expected AFR of the pre-chamber combustion gases (dashed plot 906) in the example of timeline 900, suggesting that the commanded amount of air is being injected and the commanded amount of fuel is being injected. During the fuel injection sweep, the actual AFR of the pre-chamber combustion gases (plot 908) remains approximately the same as the expected AFR of the pre-chamber combustion gases (dashed plot 906).

At time t2, the controller compares the expected AFR of the pre-chamber combustion gases (dashed plot 906) and the actual AFR of the pre-chamber combustion gases (plot 908) during each AFR perturbation in the series to determine whether less air is being injected than commanded (e.g., a negative non-zero air injection offset), more fuel is being injected than commanded (e.g., a positive non-zero fuel injection offset), or both, as elaborated above with respect to FIGS. 4 and 6. In the particular example of timeline 900, the relationship between the expected AFR and the actual AFR, wherein the expected AFR is approximately the same as the actual AFR during each AFR perturbation in the series, may be characteristic of no fuel injection offset and no air injection offset.

Thus, in example timeline 900, the pre-chamber air injection offset is zero, indicating that the pre-chamber air injector is accurately delivering the commanded amount of air, and the pre-chamber fuel injection offset is zero, indicating that the pre-chamber fuel injector is accurately delivering the commanded amount of fuel. Therefore, when nominal pre-chamber operation commences at time t3 (which is some duration after time t2), the commanded pre-chamber air injection amount (plot 902) is maintained at the nominal air injection amount (dotted line 910) and the commanded pre-chamber fuel injection amount (plot 904) is maintained at the nominal pre-chamber fuel injection amount (dashed line 912). As a result, the actual AFR of the pre-chamber combustion gases (plot 908) is expected to be equal to the nominal AFR (dotted line 914).

In this way, a controller may adjust operation of spark-ignition engine with a pre-chamber ignition system to diagnose and correct a pre-chamber fuel injection offset and/or a pre-chamber air injection offset. For example, during a fuel-cut event, the controller may reduce air flow through the engine while deactivating cylinder fueling. Further, one or more pre-chambers of the engine may be operated with a series of AFR perturbations, and resulting AFR values of exhaust gas from the pre-chamber may be measured via an exhaust gas oxygen sensor, for example. As a result, the controller may determine an air injection offset and a fuel injection offset based on differences between expected AFR values of the exhaust gas from the pre-chamber and the resulting AFR values of the exhaust gas from the pre-chamber. If the controller determines a non-zero air injection offset and/or a non-zero fuel injection offset, the corresponding injection amount may be adjusted to compensate for the determined injection offsets. By diagnosing and correcting pre-chamber injection offsets, an occurrence of pre-chamber, and thus cylinder, misfire may be reduced. Further, diagnosing and correcting the pre-chamber injection offsets may increase ignition control and increase fuel efficiency, as a desired air-fuel mixture may be more accurately produced in the pre-chamber. Overall, diagnosing and correcting the pre-chamber injection offsets may increase customer satisfaction and decrease maintenance costs relative to engine systems with undiagnosed pre-chamber injection offsets.

The technical effect of reducing engine air flow and operating a pre-chamber with a series of air-fuel ratio perturbations during a fuel-cut event is that pre-chamber air injection offsets and pre-chamber fuel injection offsets may be identified and corrected, enabling accurate pre-chamber operation at a commanded AFR, which may reduce an incidence of pre-chamber misfire. A reduction in the incidence of pre-chamber misfire may mitigate a need for maintenance and/or component replacement.

In one example, a method comprises: adjusting at least one of an air injection amount and a fuel injection amount to a pre-chamber of an engine based on offsets learned while discontinuing fueling to cylinders of the engine and reducing air flow through the engine. In the proceeding example, additionally or optionally, the offsets learned while discontinuing fueling to the cylinders of the engine and reducing air flow through the engine are learned by measuring combustion gases from the pre-chamber generated while operating the pre-chamber with a series of air-fuel ratio (AFR) perturbations. In one or both of the preceding examples, additionally or optionally, measuring the combustion gases from the pre-chamber generated while operating the pre-chamber with the series of AFR perturbations includes: producing an air-fuel mixture in the pre-chamber by actuating a fuel injector of the pre-chamber via a first actuation signal and actuating an air injector of the pre-chamber via a second actuation signal; igniting the air-fuel mixture in the pre-chamber via a spark plug to generate the combustion gases; and adjusting one of the first actuation signal and the second actuation for each AFR perturbation in the series of AFR perturbations. In any or all of the preceding examples, additionally or optionally, measuring the combustion gases from the pre-chamber generated while operating the pre-chamber with the series of AFR perturbations further includes: measuring the combustion gases from the pre-chamber during each AFR perturbation in the series of AFR perturbations using an exhaust gas oxygen sensor; and determining an AFR of the combustion gases during each AFR perturbation in the series of AFR perturbations based on measurements made by the exhaust gas oxygen sensor. In any or all of the preceding examples, additionally or optionally, the offsets learned while discontinuing fueling to the cylinders of the engine and reducing air flow through the engine are determined based on the determined AFR of the combustion gases during each AFR perturbation in the series of AFR perturbations relative to an expected AFR for each AFR perturbation in the series of AFR perturbations. In any or all of the preceding examples, additionally or optionally, the offsets learned while discontinuing fueling to the cylinders of the engine and reducing air flow through the engine include an air injection offset determined for the air injector of the pre-chamber and a fuel injection offset determined for the fuel injector of the pre-chamber. In any or all of the preceding examples, additionally or optionally, adjusting at least one of the air injection amount and the fuel injection amount to the pre-chamber includes, while fueling the cylinders of the engine and adjusting air flow through the engine based on at least an engine load, adjusting the first actuation signal based on the air injection offset and adjusting the second actuation signal based on the fuel injection offset. In any or all of the preceding examples, additionally or optionally, reducing air flow through the engine includes deactivating an intake valve of each cylinder of the engine. In any or all of the preceding examples, additionally or optionally, reducing air flow through the engine includes fully closing a throttle valve positioned in an air intake passage of the engine and operating an intake valve of each cylinder of the engine with one or more of a smallest amount of valve lift and a retarded intake valve opening timing.

As another example, a method comprises: while cylinder fueling is discontinued in an engine having a pre-chamber ignition system, determining an air injection offset and a fuel injection offset of a selected pre-chamber of the pre-chamber ignition system based on measurements obtained from an exhaust gas sensor while operating the selected pre-chamber with a series of air-fuel ratio (AFR) perturbations. In the preceding example, additionally or optionally, operating the selected pre-chamber with the series of AFR perturbations includes, for each AFR perturbation in the series of AFR perturbations, adjusting one of a commanded air injection amount and a commanded fuel injection amount for an air-fuel mixture provided to the selected pre-chamber and igniting the air-fuel mixture in the selected pre-chamber to produce combustion gases. In one or both of the preceding examples, determining the air injection offset and the fuel injection offset of the selected pre-chamber based on the measurements obtained from the exhaust gas sensor includes comparing an expected AFR of the combustion gases to a measured AFR of the combustion gases for each AFR perturbation in the series of AFR perturbations. In any or all of the preceding examples, additionally or optionally, for each AFR perturbation in the series of AFR perturbations, the expected AFR of the combustion gases is determined based on the commanded air injection amount and the commanded fuel injection amount, and the measured AFR of the combustion gases is determined based on the measurements obtained from the exhaust gas sensor. In any or all of the preceding examples, additionally or optionally, the exhaust gas sensor is an oxygen sensor, the measurements obtained from the exhaust gas sensor include exhaust gas oxygen measurements, and the measured AFR of the combustion gases is determined from the exhaust gas oxygen measurements obtained during each AFR perturbation in the series of AFR perturbations. In any or all of the preceding examples, additionally or optionally, the cylinder fueling is discontinued in the engine responsive to a fuel-cut condition of the engine, and the method further comprises reducing intake air flow to the engine while determining the air injection offset and the fuel injection offset of the selected pre-chamber of the pre-chamber ignition system.

As another example, a system comprises: an engine including a plurality of cylinders ignited by a pre-chamber ignition system, each cylinder including a cylinder fuel injector and a pre-chamber of the pre-chamber ignition system; and a controller storing executable instructions in non-transitory memory that, when executed, cause the controller to: responsive to a fuel-cut condition, disable the cylinder fuel injector of every cylinder and learn air and fuel corrections for the pre-chamber ignition system while reducing air flow through the engine; and operate the pre-chamber ignition system with the learned air and fuel corrections. In the preceding example, additionally or optionally, each cylinder further includes a deactivatable intake valve, and wherein reducing air flow through the engine includes deactivating the intake valve of every cylinder. In one or both of the preceding examples, additionally or optionally, each pre-chamber of the pre-chamber ignition system includes an air injector configured to inject air into the corresponding pre-chamber, a pre-chamber fuel injector configured to inject fuel into the corresponding pre-chamber, and a spark plug configured to ignite the injected air and fuel within the corresponding pre-chamber. In any or all of the preceding examples, additionally or optionally, the system further comprises: an exhaust gas oxygen sensor positioned to measure combustion gases exhausted from the engine, and wherein to learn the air and fuel corrections for the pre-chamber ignition system, the controller includes further instructions stored in non-transitory memory that, when executed, cause the controller to: operate one pre-chamber of the pre-chamber ignition system with a sequence of air-fuel ratio adjustments while maintaining remaining pre-chambers of the pre-chamber ignition system deactivated; determine an actual air-fuel ratio of combustion gases produced in the one pre-chamber during each air-fuel ratio adjustment in the sequence of air-fuel ratio adjustments using measurements from the exhaust gas oxygen sensor; determine an expected air-fuel ratio of the combustion gases produced in the one pre-chamber during each air-fuel ratio adjustment in the sequence of air-fuel ratio adjustments based on a commanded air injection amount of the air injector of the one pre-chamber and a commanded fuel injection amount of the fuel injector of the one pre-chamber during each air-fuel ratio adjustment in the sequence of air-fuel ratio adjustments; and learn the air and fuel corrections of the one pre-chamber based on a relationship between the actual air-fuel ratio and the expected air-fuel ratio for each air-fuel ratio adjustment in the sequence of air-fuel ratio adjustments. In any or all of the preceding examples, additionally or optionally, to operate the one pre-chamber of the pre-chamber ignition system with the sequence of air-fuel ratio adjustments, the controller includes further instructions stored in non-transitory memory that, when executed, cause the controller to: adjust the commanded air injection of the air injector of the one pre-chamber amount while maintaining constant the commanded fuel injection amount of the fuel injector of the one pre-chamber for a first portion of the sequence of air-fuel ratio adjustments; adjust the commanded fuel injection amount of the fuel injector of the one pre-chamber while maintaining constant the commanded air injection amount of the air injector of the one pre-chamber for a second, remaining portion of the sequence of air-fuel ratio adjustments; and actuate the spark plug of the one pre-chamber during each air-fuel ratio adjustment in the sequence of air-fuel ratio adjustments.

In another representation, a method comprises: during a fuel shut-off event in an engine, learning injection offsets for a pre-chamber ignition system while adjusting cylinder intake valve operation to reduce air flow through the engine. In the preceding example, additionally or optionally, adjusting the cylinder intake valve operation to reduce the air flow through the engine includes holding the cylinder intake valve fully closed over one or more engine cycles. In one or both of the preceding examples, additionally or optionally, holding the cylinder intake valve fully closed over the one or more engine cycles includes switching to an intake cam with no lift. In any or all of the preceding examples, additionally or optionally, holding the cylinder intake valve fully closed over the one or more engine cycles includes actuating an intake valve deactivator. In any or all of the preceding examples, additionally or optionally, adjusting the cylinder intake valve operation includes switching to an intake cam with a smaller amount of lift. In any or all of the preceding examples, additionally or optionally, adjusting the cylinder intake valve operation includes adjusting a position of an intake cam. In any or all of the preceding examples, additionally or optionally, adjusting the position of the intake cam includes retarding an opening timing of the cylinder intake valve. In any or all of the preceding examples, additionally or optionally, learning the injection offsets for the pre-chamber ignition system includes learning injection offsets for an air injector and a fuel injector of each pre-chamber of the pre-chamber ignition system. In any or all of the preceding examples, additionally or optionally, learning the injection offsets for the pre-chamber ignition system includes performing an air injection sweep and performing a fuel injection sweep. In any or all of the preceding examples, additionally or optionally, performing the air injection sweep includes maintaining a fuel amount injected by the fuel injector and iteratively adjusting an air injection amount injected by the air injector. In any or all of the preceding examples, additionally or optionally, performing the fuel injection sweep includes maintaining the air injection amount injected by the air injector and iteratively adjusting the fuel injection amount injected by the fuel injector. In any or all of the preceding examples, additionally or optionally, learning the injection offsets of the pre-chamber ignition system includes measuring combustion gases from the pre-chamber produced while performing the air injection sweep and while performing the fuel injection sweep. In any or all of the preceding examples, additionally or optionally, learning the injection offsets of the pre-chamber ignition system includes comparing an air-fuel ratio of the measured combustion gases to an expected air-fuel ratio determined based on commanded air and fuel injection amounts.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
receiving an indication of cylinder misfire in an engine;
learning offsets for a pre-chamber of the engine in response to receiving the indication of cylinder misfire, the offsets learned by measuring combustion gases from the pre-chamber while both maintaining fueling discontinued to all cylinders of the engine and maintaining reduced air flow through the engine; and
adjusting at least one of an air injection amount and a fuel injection amount to the pre-chamber of the engine based on the learned offsets.

2. The method of claim 1, wherein the offsets learned by measuring the combustion gases from the pre-chamber while both maintaining the fueling discontinued to all cylinders of the engine and maintaining the reduced air flow through the engine are learned by measuring the combustion gases from the pre-chamber while operating the pre-chamber with a series of air-fuel ratio (AFR) perturbations.

3. The method of claim 2, wherein measuring the combustion gases from the pre-chamber while operating the pre-chamber with the series of AFR perturbations includes:

producing an air-fuel mixture in the pre-chamber by actuating a fuel injector of the pre-chamber via a first actuation signal and actuating an air injector of the pre-chamber via a second actuation signal;
igniting the air-fuel mixture in the pre-chamber via a spark plug to generate the combustion gases; and
adjusting one of the first actuation signal and the second actuation signal for each AFR perturbation in the series of AFR perturbations.

4. The method of claim 3, wherein measuring the combustion gases from the pre-chamber while operating the pre-chamber with the series of AFR perturbations further includes:
measuring the combustion gases from the pre-chamber during each AFR perturbation in the series of AFR perturbations using an exhaust gas oxygen sensor; and
determining an AFR of the combustion gases during each AFR perturbation in the series of AFR perturbations based on measurements made by the exhaust gas oxygen sensor.

5. The method of claim 4, wherein the offsets learned by measuring the combustion gases from the pre-chamber while both maintaining the fueling discontinued to all cylinders of the engine and maintaining the reduced air flow through the engine are determined based on the determined AFR of the combustion gases during each AFR perturbation in the series of AFR perturbations relative to an expected AFR for each AFR perturbation in the series of AFR perturbations.

6. The method of claim 3, wherein the offsets learned by measuring the combustion gases from the pre-chamber while both maintaining the fueling discontinued to all cylinders of the engine and maintaining the reduced air flow through the engine include an air injection offset determined for the air injector of the pre-chamber and a fuel injection offset determined for the fuel injector of the pre-chamber.

7. The method of claim 6, wherein adjusting at least one of the air injection amount and the fuel injection amount to the pre-chamber includes, while fueling the cylinders of the engine and adjusting the air flow through the engine based on at least an engine load, adjusting the first actuation signal based on the air injection offset and adjusting the second actuation signal based on the fuel injection offset.

8. The method of claim 1, wherein maintaining the reduced air flow through the engine includes deactivating an intake valve of each cylinder of the engine.

9. The method of claim 1, wherein maintaining the reduced air flow through the engine includes maintaining fully closed a throttle valve positioned in an air intake passage of the engine and operating an intake valve of each cylinder of the engine with one or more of a smallest amount of valve lift and a retarded intake valve opening timing.

10. A method, comprising:
receiving an indication of cylinder misfire; and
responsive to receiving the indication of cylinder misfire and while cylinder fueling is discontinued in every cylinder of an engine having a pre-chamber ignition system, determining an air injection offset and a fuel injection offset of a selected pre-chamber of the pre-chamber ignition system based on measurements obtained from an exhaust gas sensor while operating the selected pre-chamber with a series of air-fuel ratio (AFR) perturbations.

11. The method of claim 10, wherein operating the selected pre-chamber with the series of AFR perturbations includes, for each AFR perturbation in the series of AFR perturbations, adjusting one of a commanded air injection amount and a commanded fuel injection amount for an air-fuel mixture provided to the selected pre-chamber and igniting the air-fuel mixture in the selected pre-chamber to produce combustion gases.

12. The method of claim 11, wherein determining the air injection offset and the fuel injection offset of the selected pre-chamber based on the measurements obtained from the exhaust gas sensor includes comparing an expected AFR of the combustion gases to a measured AFR of the combustion gases for each AFR perturbation in the series of AFR perturbations.

13. The method of claim 12, wherein for each AFR perturbation in the series of AFR perturbations, the expected AFR of the combustion gases is determined based on the commanded air injection amount and the commanded fuel injection amount, and the measured AFR of the combustion gases is determined based on the measurements obtained from the exhaust gas sensor.

14. The method of claim 13, wherein the exhaust gas sensor is an oxygen sensor, the measurements obtained from the exhaust gas sensor include exhaust gas oxygen measurements, and the measured AFR of the combustion gases is determined from the exhaust gas oxygen measurements obtained during each AFR perturbation in the series of AFR perturbations.

15. The method of claim 10, wherein the cylinder fueling is discontinued in the engine responsive to a fuel-cut condition of the engine, and the method further comprises reducing intake air flow to the engine while determining the air injection offset and the fuel injection offset of the selected pre-chamber of the pre-chamber ignition system.

16. A system, comprising:
an engine including a plurality of cylinders ignited by a pre-chamber ignition system, each cylinder including a cylinder fuel injector and a pre-chamber of the pre-chamber ignition system; and
a controller storing executable instructions in non-transitory memory that, when executed, cause the controller to:
learn air and fuel corrections for the pre-chamber ignition system responsive to a fuel-cut condition after a misfire counter reaches a threshold number, the learning performed by measuring combustion gases from the pre-chamber ignition system while disabling the cylinder fuel injector of every cylinder and while air flow through the engine is reduced; and
operate the pre-chamber ignition system with the learned air and fuel corrections.

17. The system of claim 16, wherein each cylinder further includes a deactivatable intake valve, and wherein air flow through the engine is reduced by deactivating the deactivatable intake valve of every cylinder.

18. The system of claim 16, wherein each pre-chamber of the pre-chamber ignition system includes an air injector configured to inject air into a corresponding pre-chamber, a pre-chamber fuel injector configured to inject fuel into the corresponding pre-chamber, and a spark plug configured to ignite the injected air and fuel within the corresponding pre-chamber.

19. The system of claim 18, further comprising an exhaust gas oxygen sensor positioned to measure gases exhausted from the engine, and wherein to learn the air and fuel corrections for the pre-chamber ignition system, the controller includes further instructions stored in non-transitory memory that, when executed, cause the controller to:
operate one pre-chamber of the pre-chamber ignition system with a sequence of air-fuel ratio adjustments while maintaining remaining pre-chambers of the pre-chamber ignition system deactivated;
determine an actual air-fuel ratio of the combustion gases produced in the one pre-chamber during each air-fuel ratio adjustment in the sequence of air-fuel ratio adjustments using measurements from the exhaust gas oxygen sensor;
determine an expected air-fuel ratio of the combustion gases produced in the one pre-chamber during each air-fuel ratio adjustment in the sequence of air-fuel ratio adjustments based on a commanded air injection amount of the air injector of the one pre-chamber and a commanded fuel injection amount of the pre-chamber fuel injector of the one pre-chamber during each air-fuel ratio adjustment in the sequence of air-fuel ratio adjustments; and
learn the air and fuel corrections of the one pre-chamber based on a relationship between the actual air-fuel ratio and the expected air-fuel ratio for each air-fuel ratio adjustment in the sequence of air-fuel ratio adjustments.

20. The system of claim 19, wherein to operate the one pre-chamber of the pre-chamber ignition system with the sequence of air-fuel ratio adjustments, the controller includes further instructions stored in non-transitory memory that, when executed, cause the controller to:
adjust the commanded air injection amount of the air injector of the one pre-chamber while maintaining constant the commanded fuel injection amount of the pre-chamber fuel injector of the one pre-chamber for a first portion of the sequence of air-fuel ratio adjustments;
adjust the commanded fuel injection amount of the pre-chamber fuel injector of the one pre-chamber while maintaining constant the commanded air injection amount of the air injector of the one pre-chamber for a second, remaining portion of the sequence of air-fuel ratio adjustments; and
actuate the spark plug of the one pre-chamber during each air-fuel ratio adjustment in the sequence of air-fuel ratio adjustments.

\* \* \* \* \*